US006785240B1

(12) United States Patent
Cao et al.

(10) Patent No.: US 6,785,240 B1
(45) Date of Patent: Aug. 31, 2004

(54) METHOD FOR ESTIMATING THE TRAFFIC MATRIX OF A COMMUNICATION NETWORK

(75) Inventors: Jin Cao, Edison, NJ (US); R. Drew Davis, Piscataway, NJ (US); Scott Alan Vander Wiel, Fanwood, NJ (US); Bin Yu, Berkeley, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 706 days.

(21) Appl. No.: 09/585,738

(22) Filed: Jun. 2, 2000

(51) Int. Cl.[7] .................................................. H04J 1/16
(52) U.S. Cl. ........................................ 370/238; 370/252
(58) Field of Search ................................ 370/229, 230, 370/230.1, 231, 235, 237, 238, 255, 389, 392, 400, 401, 252, 419, 463, 359; 709/223.2, 226, 238, 244 N

(56) References Cited

U.S. PATENT DOCUMENTS

| | | | | |
|---|---|---|---|---|
| 6,061,331 A | * | 5/2000 | Conway et al. | 370/232 |
| 6,173,325 B1 | * | 1/2001 | Kukreja | 709/224 |
| 6,178,448 B1 | * | 1/2001 | Gray et al. | 709/224 |
| 6,229,815 B1 | * | 5/2001 | Huang et al. | 370/437 |
| 6,347,077 B1 | * | 2/2002 | Ginzboorg | 370/230 |
| 6,385,172 B1 | * | 5/2002 | Kataria et al. | 370/238 |
| 6,560,198 B1 | * | 5/2003 | Ott et al. | 370/235 |
| 6,560,204 B1 | * | 5/2003 | Rayes | 370/523 |
| 6,597,660 B1 | * | 7/2003 | Rueda et al. | 370/230.1 |

OTHER PUBLICATIONS

IEEE, 8/00 "Estimation of the Renewal Function by Empirical Data—A Bayesian Approach" Udo et al, pp. 293–300.*
Anderson, B.D.O. and Moore, J.B., *Optimal Filtering*, (Anderson and Moore, 1979), Prentice–Hall, 1979.
The Cooperative Association for Internet Data Analysis. *Cflowd Flow Analysis Software (version 2.0).*, Author, 1999, www.caida.org/Tools/Cflowd, (CAIDA, 1999).
Gelman, A., Carlin, J.B., Stern, H.S., and Rubin, D.B., *Bayesian Data Analysis*, Chapman & Hall, 1995, (Gelman et al., 1995).
Hastie, T.J. and Tibshirani, R.J., *Generalized Additive Models*, Chapman & Hall, London, 1990, (Hastie and Tibshirani, (1990).
Loader, C., *Local Regression and Likelihood*, Springer–Verlag, New York, 1999, (Loader, 1999).
West, M. and Harrison, J., *Bayesian Forecasting and Dynamic Models*, Springer–Verlag, New York, 1997, (West and Harrison, 1997).
Anderson, B.D.O. and Moore, J.B., *Optimal Filtering*, (Anderson and Moore, 1979), Prentice–Hall, 1979.
The Cooperative Association for Internet Data Analysis. *Cflowd Flow Analysis Software (version 2.0).*, Author, 1999, www.caida.org/Tools/Cflowd, (CAIDA, 1999).
Gelman, A., Carlin, J.B., Stern, H.S., and Rubin, D.B., *Bayesian Data Analysis*, Chapman & Hall, 1995, (Gelman et al., 1995).

(List continued on next page.)

*Primary Examiner*—Andy Lee
(74) *Attorney, Agent, or Firm*—Martin I. Finston

(57) ABSTRACT

In many packetized communication networks, it is not feasible to obtain exact counts of traffic (OD counts) between specific origin-destination node pairs, because the link counts that are readily obtainable at router interfaces are aggregated indiscriminately over OD pairs. The best that can be done is to make a probabilistic inference concerning the OD counts from the observed link counts. Such an inference relies upon a known linear relationship between observed link counts and unknown OD counts, and a statistical model describing how the values of the OD and link counts are probabilistically distributed. Disclosed is an improved method for making such inferences. The disclosed method takes explicit account of past data when forming a current estimate of the OD counts. As a consequence, behavior that evolves in time is described with improved accuracy and smoothness.

2 Claims, 17 Drawing Sheets

OTHER PUBLICATIONS

Hastie, T.J. and Tibshirani, R.J., *Generalized Additive Models*, Chapman & Hall, London, 1990, (Hastie and Tibshirani, (1990).

Loader, C., *Local Regression and Likelihood*, Springer–Verlag, New York, 1999, (Loader, 1999).

West, M. and Harrison, J., *Bayesian Forecasting and Dynamic Models*, Springer–Verlag, New York, 1997, (West and Harisson, 1997).

Vardi, Y, "Network tomography: Estimating source–destination traffic intensities from link data" *J. amer. Statistical Assoc.* (1996).

Tebaldi, C., et al., "Bayesian inference on network traffic using link count data," *J. Amer. Statistical Assoc.* (1998).

Vanderbei, R.J., et al., "An EM approach to OD matrix estimation,"*Technical Report SOR 94–04*, Princeton University (1994).

Chambers, J.M., et al., *Statistical Model in S.*, Chapman & Hall, (1993).

Csiszer, I., "I–Divergence Geometry of Probability Distributions and Minimization Problems" *The Annals of Probability*, vol. 3, No. 1, pp. 146–158 (1975).

Dempster, A.P., et al., "Maximum Likelihood from Incomplete Data via the EM Algorithm," *Journal of Royal Statistical Society*, Series B, vol. 39, No. 1, (1977).

Gay, D.M., "Algorithm 611: Subroutines for Unconstrained Minimization Using a Model/Trust–Region Approach", *ACM Transactions on Mathematical Software*, vol. 9, No. 4, pp. 503–524 (1983).

Ireland, C.T., et al., "Contingency tables with given marginals", *Biometrika*, 55, 1, pp. 179–188 (1968).

Ku, H.H., et al., "Interaction in Multidimensional Contingency Tables: An information Theoretic Approach", *Journal of Research of the National Burea of Standards*, vol. 72B, No. 3, pp. 159–199 (1968).

Lange, K., "A Gradient Algorithm Locally Equivalent to the EM Algorithm", *Journal of the American Statistical Society*, 57, No. 2, pp. 425–437 (1995).

* cited by examiner

FIG. 2A

| ORIGIN | | 1 | 1 | 1 | 1 | 2 | 2 | 2 | 2 | 3 | 3 | 3 | 3 | 4 | 4 | 4 | 4 |
|---|---|---|---|---|---|---|---|---|---|---|---|---|---|---|---|---|---|
| DESTINATION | | 1 | 2 | 3 | 4 | 1 | 2 | 3 | 4 | 1 | 2 | 3 | 4 | 1 | 2 | 3 | 4 |
| INTERFACE | | | | | | | | | | | | | | | | | |
| IN | 1 | 1 | 1 | 1 | 1 | | | | | | | | | | | | |
| | 2 | | | | | 1 | 1 | 1 | 1 | | | | | | | | |
| | 3 | | | | | | | | | 1 | 1 | 1 | 1 | | | | |
| | 4 | | | | | | | | | | | | | 1 | 1 | 1 | 1 |
| OUT | 1 | 1 | | | | 1 | | | | 1 | | | | 1 | | | |
| | 2 | | 1 | | | | 1 | | | | 1 | | | | 1 | | |
| | 3 | | | 1 | | | | 1 | | | | 1 | | | | 1 | |
| | 4 | | | | 1 | | | | 1 | | | | 1 | | | | 1 |

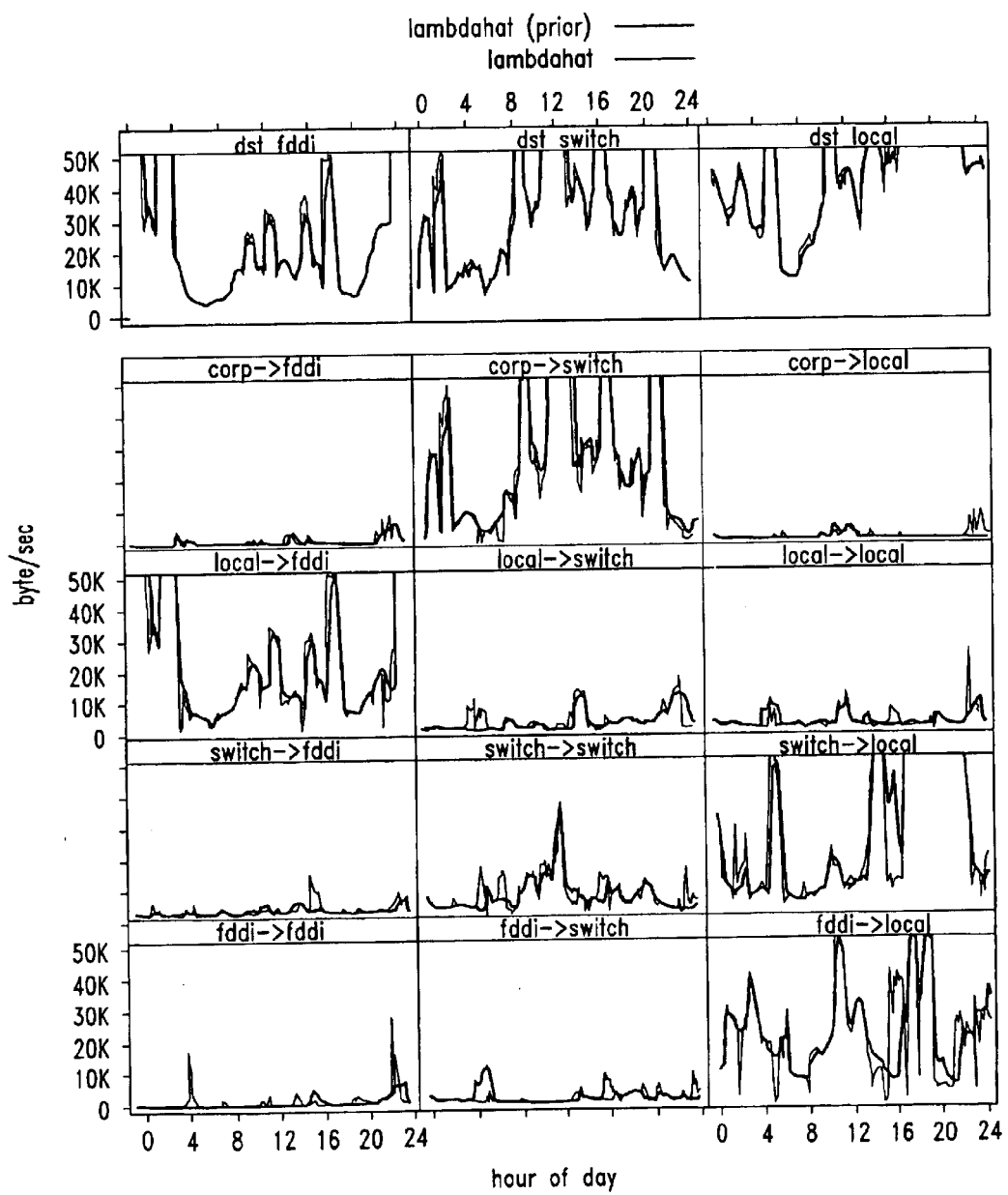

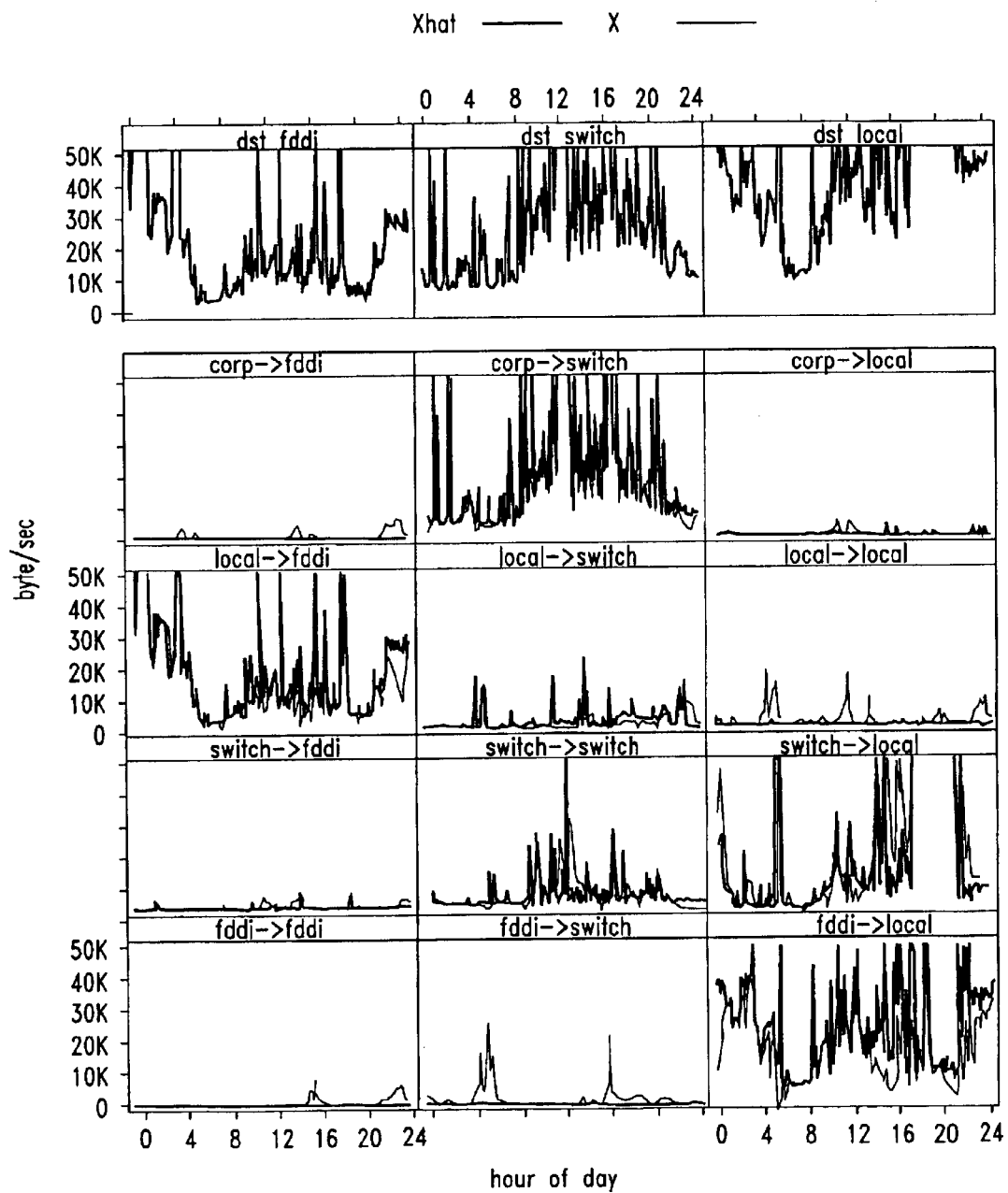

METHOD FOR ESTIMATING THE TRAFFIC MATRIX OF A COMMUNICATION NETWORK

FIELD OF THE INVENTION

The invention relates to methods of traffic measurement in packetized communication networks. More particularly, the invention relates to methods for inferring the amount of data passing between particular origin-destination node pairs, from undifferentiated measurements made at network routers.

ART BACKGROUND

FIG. 1A shows a simple, illustrative network for packetized communication. One example of such a network is a local area network (LAN) of computers. In the network illustrated, router 10 is directly connected to edge nodes 15.1–15.4 via respective links 20.1–20.4, and each of the edge nodes is connected to a respective group of hosts or users 25.1–25.4. The router directs traffic in the network by forwarding packets between nodes according to a routing scheme. Edge nodes, i.e., nodes directly connected to the router, are origin or destination nodes for such traffic. Each node pair between which traffic is being forwarded is denominated an origin-destination (OD) pair. It should be noted that although a single router is shown in the figure, the direction of traffic may alternatively be carried out by multiple routers, by one or more switches, by a combination of routers and switches, or by yet other devices that forward packet traffic.

The set of traffic counts, typically expressed as total bytes of data or total number of packets or connections, between all of the OD pairs is referred to as the traffic matrix. Knowledge of the traffic matrix is valuable to network operators for, e.g., revising network designs and routing schemes to avoid traffic bottlenecks, and for differential pricing of service.

Router 10 will typically have a respective interface 30.1–30.4 associated with each of links 20.1–20.4. As shown in the figure, each of links 20.1–20.4 carries traffic bidirectionally, and each interface should be regarded as functionally subdivided into respective portions for handling incoming and outgoing traffic.

Generally, the router is able to measure the counts of incoming and outgoing traffic at each interface. We refer to these traffic measurements as the link counts. For example, link counts are readily obtainable via the Simple Network Management Protocol (SNMP), which is implemented in almost all commercial routers. That is, through the SNMP protocol, counts of incoming bytes received from each link interface and counts of outgoing bytes sent on each link interface can be obtained by polling at, e.g., regular five-minute intervals Unfortunately, the incoming link counts are typically aggregated over all possible destination nodes, and the outgoing link counts are likewise aggregated over all possible origination nodes. Consequently, it is generally impossible to derive the traffic matrix from the link counts with mathematical certainty. The difficulty is further compounded in networks having more than one router or switch.

The best that can be done is to make a probabilistic inference concerning the traffic matrix from the observed link counts. Such an inference relies upon two elements: (i) the recognition that a set of linear equations relates the observed link counts to the unknown OD counts, and (ii) the adoption of a statistical model to describe how the values of the link counts are probabilistically distributed. Given these two elements, it is possible, through the application of conditional probabilities, to estimate the set of OD counts that are most likely in view of the link counts that have been measured.

Simple implementations of such an approach have been described, for example, in Y. Vardi, "Network tomography: Estimating source-destination traffic intensities from link data," *J. Amer. Statistical Assoc.* (1996), C. Tebaldi et al., "Bayesian inference on network traffic using link count data," *J. Amer. Statistical Assoc.* (1998), and R. J. Vanderbei et al., "An EM approach to OD matrix estimation," *Technical Report SOR* 94–04, Princeton University (1994). However, there is a need for further improvements in the accuracy of the resulting estimates of the traffic matrix, particularly when the traffic data are evolving in time, or when the assumption of a Poisson relation between the means and variances of the statisitical model, adopted in earlier work, is not realistic.

SUMMARY OF THE INVENTION

We have developed an improved method for estimating the OD counts from the link counts. Our method is the first to include an explicit treatment of data as a time series having a past and a future. Our method takes explicit account of past data when forming a current estimate of the OD counts. As a consequence, behavior that evolves in time is described by our method with greater accuracy. A further advantage of our method is that the estimated OD counts evolve with improved smoothness.

According to our method, a statistical model is assumed for the distribution of the OD counts. In an exemplary embodiment, the model is multivariate, iid, and normal. A normal distribution is parametrized by a mean value for each of the variables and a variance matrix. However, in our exemplary embodiment, the variance is assumed to be a function of the means, so the only independent parameters are the means and a scale factor that helps to define the variance.

An exact enumeration of the OD counts cannot be derived directly from the link counts. However, given the measured link counts and a statistical model, it is possible to construct a likelihood that describes how likely the observed counts are, depending on given values of the independent parameters of the statistical model.

Those skilled in the art of Bayesian analysis, and more particularly in applications of the well-known EM algorithm, will appreciate that a function known as the Q function expresses the expected value of such a likelihood function. The value that the Q function takes is conditioned on the observed set of link counts, and it is also conditioned on a current estimate of the independent parameters of the statistical model. In application of the EM algorithm, the estimate of the independent parameters is refined through a series of iterations in which the Q function corresponding to a current estimate of the independent parameters is maximized to yield an updated parameter estimate.

Each of the iterations carried out in application of the EM algorithm is typically applied to the same set of data as the previous iterations. As the parameter estimate continues to improve through these iterations, the value of the likelihood function increases toward a maximum.

In contrast to methods of the prior art, our method permits further refinement of the parameter estimates. This is achieved, as above, by performing a series of iterations that drive a function toward a maximum value. However, the function is now a penalized likelihood function that depends not only on a current time window of observed link counts, but also on a prior distribution of the parameters themselves, based on link counts observed in previous time windows.

According to one embodiment of the invention, an initial estimate of the model parameters is obtained from the EM algorithm using only the sequence of link counts measured in a given time window. Then, in a subsequent stage (which may also apply the EM algorithm, or a different algorithm), a series of iterations is carried out to drive a penalized likelihood function toward a maximum value. This penalized likelihood function depends on both of: the link counts measured in the given time window, and a prior distribution of the independent parameters of the statistical model, as obtained from one or more earlier time windows.

The OD counts are then estimated as a conditional expectation depending on the measured link counts, the statistical model using the refined parameter evaluation, and the routing scheme of the network.

BRIEF DESCRIPTION OF THE DRAWINGS

FIG. 2A illustrates the incidence matrix A for the network of FIG. 1A.

FIGS. 1(a) and 1(b) represent at two levels of detail an illustrative packetized communication network that has been in actual use.

DETAILED DESCRIPTION

Overview

Figure 1:
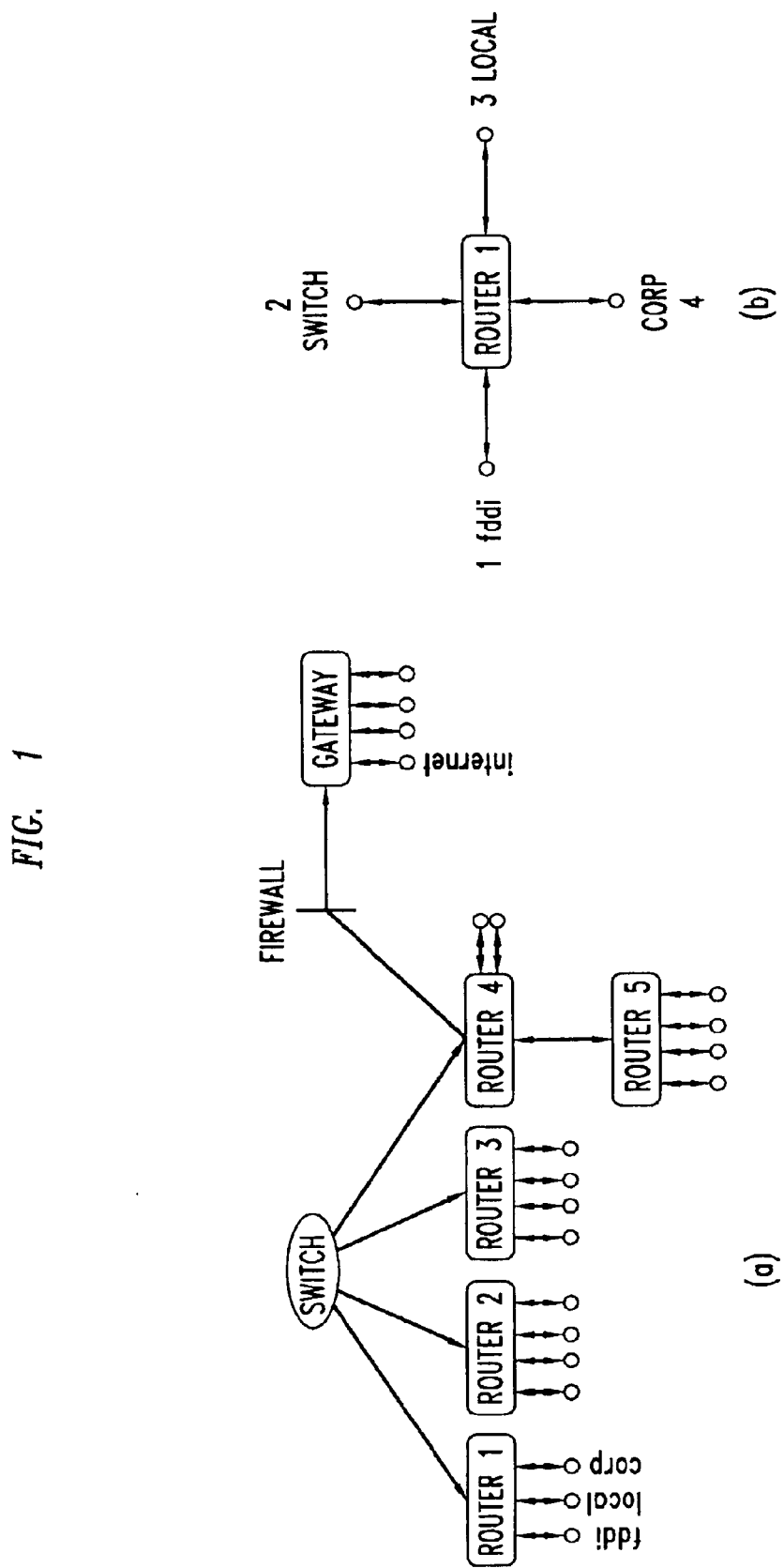
Figure 1A:
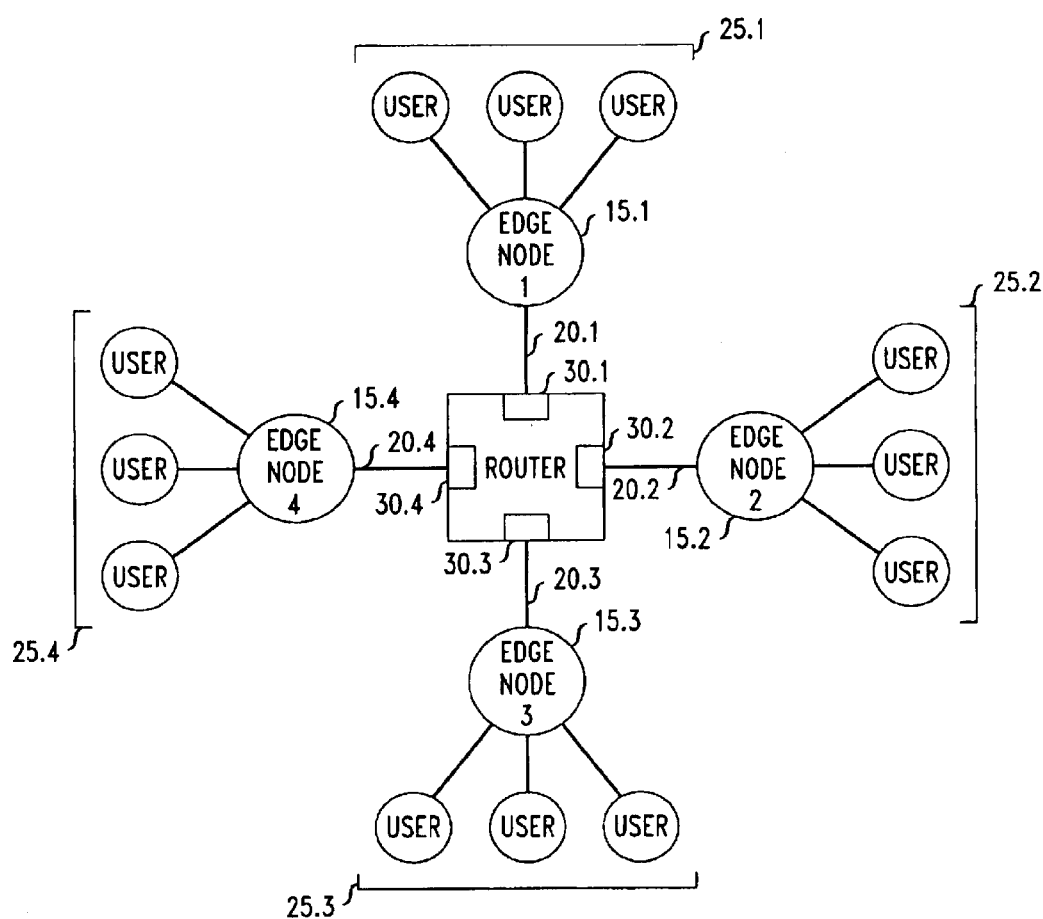
FIG. 1A shows a simple, illustrative network for packetized communication.

FIG. 2A illustrates the incidence matrix A for the network of FIG. 1A. The incidence matrix represents the routing scheme for the network. Each router interface, with incoming and outgoing interfaces counted separately, corresponds to a respective row of the matrix. Each OD pair corresponds to a respective column. Each pair of nodes A,B is counted twice: once when A is the origination node, and once when B is the origination node. (However, each of the self-pairs (1,1), (2,2), (3,3) and (4,4) is included only once in the matrix.) In each column, a 1 is inserted for each interface through which the corresponding traffic is routed. All other entries in the matrix are zeroes. (The zero entries are left blank in the figure.) The incidence matrix expresses the linear relationship between the link counts and the OD counts, as explained below.

We represent the unobserved OD counts in a unit time interval ending at time t by a vector $x_t=(x_{t,1}, \ldots, x_{t,I})'$. There are a total of I OD pairs ordered, e.g., as for the columns of the matrix of FIG. 2A. Each element of the vector is, e.g., an average number of bytes passing per second between a corresponding OD pair. The symbol "'" denotes matrix transposition, thus indicating that in our representation, the x-vector is a column vector.

We represent the observed link counts accruing in a unit interval ending at time t by a vector $y_t=(y_{t,1}, \ldots, y_{t,J})'$. There are a total of J router interfaces ordered, e.g., as for the rows of the matrix of FIG. 2A. However, there is linear dependence among the router interfaces, because flow conservation requires that the sum of all incoming link counts must equal the sum of all outgoing link counts. If there is only a single router, then to remove redundancy, it is sufficient to delete one element of the y-vector, exemplarily the last outgoing element. If there are multiple routers, then one element is deleted per router. Like the x-vector, the y-vector is a column vector in our representation.

The link count at each interface is the sum of the OD counts for all OD pairs routed through that interface. Such sums are readily obtained in vector form as the matrix product of the A-matrix times the x-vector. That is, $$y_t = Ax_t. \quad\quad\quad (Eq. A1)$$

Generalization of the exemplary single-router A-matrix to A-matrices for multiple-router networks is straightforward and need not be described.

To simplify notation in the following discussion, the subscript "t" will be deleted from $x_t$, $\lambda_t$, and $\Sigma_t$ and the components thereof.

According to a currently preferred statistical model, the x-vector is modeled as a vector of independent normal random variables having parameters $\underline{\lambda}$ and $\underline{\Sigma}$, wherein $\underline{\lambda}$ is a vector of mean values of the respective elements of the x-vector, and $\underline{\Sigma}$ is the diagonal variance matrix. Because of the linear relationship between the x-vector and the y-vector, the y-vector is also modeled as a vector of normal random variables, wherein $A\underline{\lambda}$ is the vector of mean values of the respective elements of the y-matrix, and $A\underline{\Sigma}A'$ is the variance matrix.

To reduce the number of unknown parameters of the statistical model, it is advantageous to posit that the variance $\underline{\Sigma}$ is a function of the means $\underline{\lambda}$, having a known functional form. Accordingly, we represent the variance as a diagonal matrix, whose i'th diagonal element, i=1, ..., I, is $\phi\lambda_i^c$, wherein $\phi$ is a positive scale parameter, and c is a constant. The parameter $\phi$ is subject to optimization along with the means $\underline{\lambda}$. Because $\phi$ is a scale parameter, it can be used to adjust between traffic measurements in bytes and, e.g., traffic measurements in bytes per second. The constant c, which is typically in the range 1–2, can be chosen, e.g., by trial and error.

Previously described methods, such as that of Y. Vardi, *J. Amer. Statistical Assoc.* (1996), cited above, have been used to make an inference on $\underline{\lambda}$ and $\underline{x}$ (with $\phi\equiv1$) using only link counts for a single given data set, which is analogous to a single time window in our time-varying framework. We have shown, for the first time, how to improve this inference, especially in a time-varying network, by using explicitly sequenced data and by also using link counts from preceding time windows to produce a prior distribution of the parameters relevant to the current time window.

We have also shown for the first time how a (more general) normal approximation to the usual Poisson model can be used to facilitate maximum likelihood computations which were rejected as too complex in the above-cited paper by Y. Vardi (1996). Moreover, we have invented a method for using maximum (penalized) likelihood estimates of the parameters $\phi$ and $\underline{\lambda}$ to produce an estimate of the x-vector that satisfies Eq. (A1) and approximates the conditional expectation of $\underline{x}$ given the link measurements and the parameter estimates.

Figure 3:
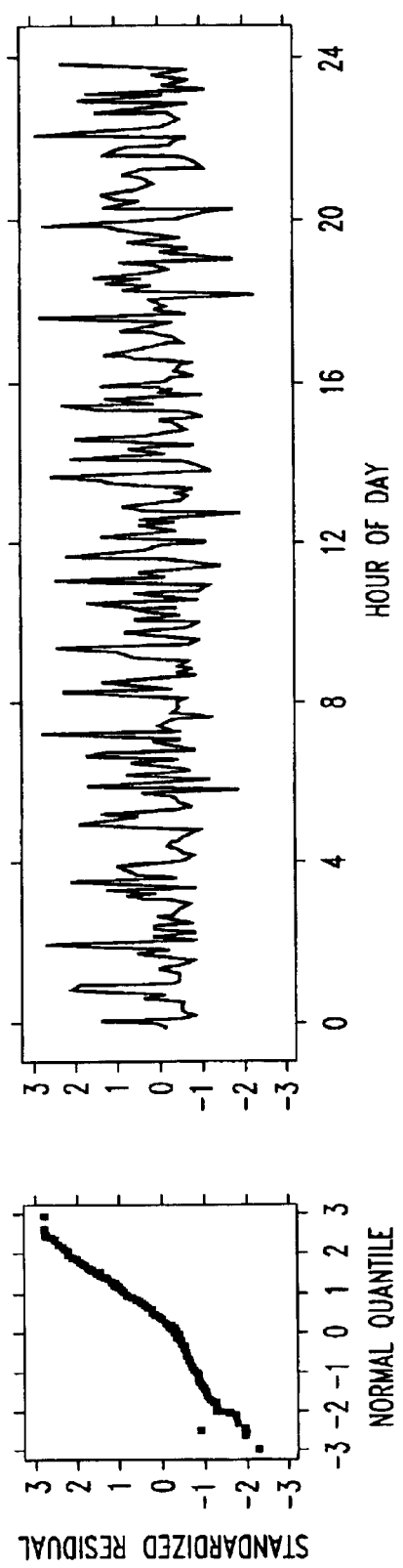
FIG. 3 is a pair of plots of locally standardized residuals from the link counts of FIG. 2.
Figure 3A:
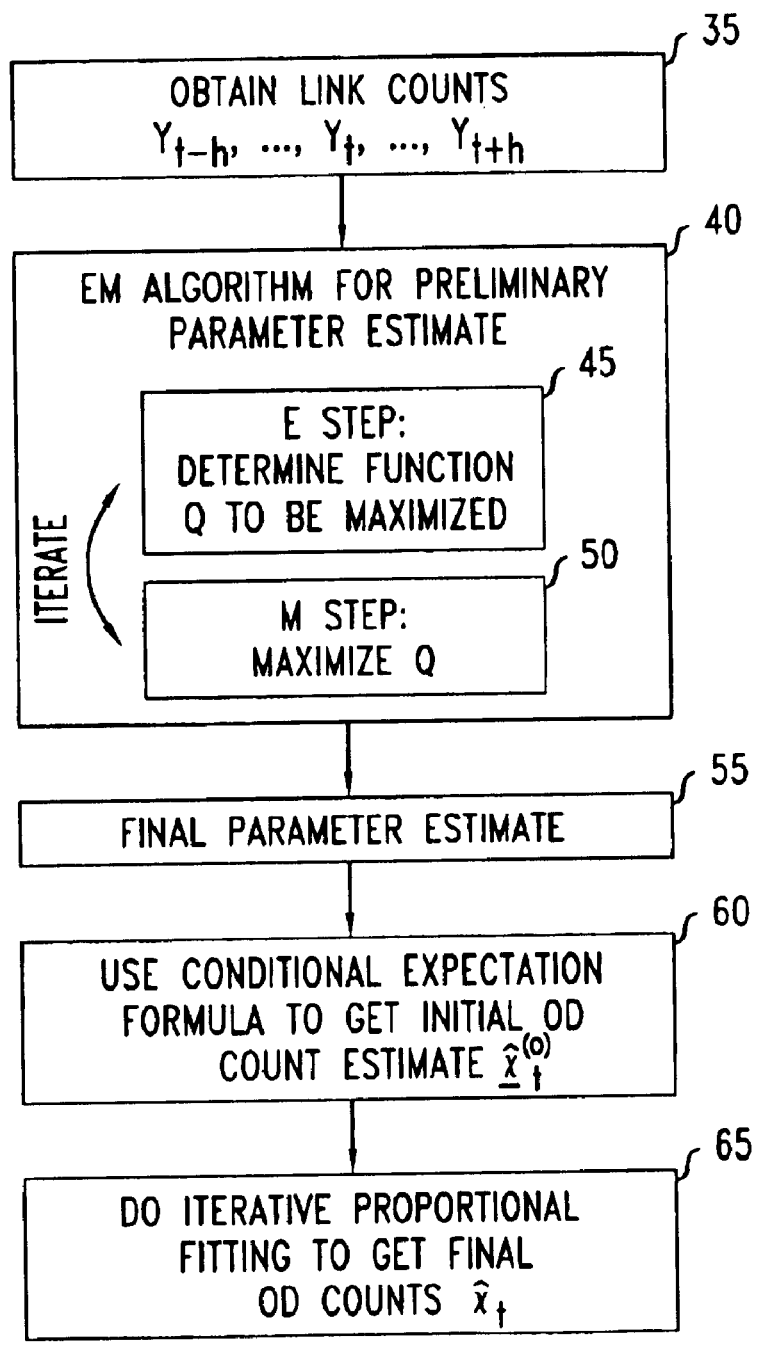
FIG. 3A is a flowchart of the inventive method, in an illustrative embodiment, shown at a conceptual level.

FIG. 3A shows the steps of our procedure at a conceptual level. At block 35, the measured link counts for a time window of length 2h+1 unit time intervals, centered at time t, is obtained. At block 40, an estimate of the parameter set is obtained by running the well-known EM algorithm. At block 55, a further procedure is optionally used to obtain a refined estimate of the parameter set.

Significantly, in at least one of steps 40 and 55, a parameter estimate is made using not only the link counts for the current time window, i.e., the time window centered at t, but also using link counts from at least one preceding time window. The link counts from one or more preceding time windows are used indirectly, by way of the prior distribution of the vector $\underline{\lambda}$ of mean values and the variance scale $\phi$. In this regard, the prior distribution (also referred to herein as the "prior") is a function of the vector $\underline{\lambda}$ and $\phi$. At each possible value $(\underline{\lambda}_0, \phi_0)$ of $(\underline{\lambda}, \phi)$, the value of the prior distribution is the probabilty density, based on earlier data, corresponding to the parameters in the underlying satistical model having values equal to the respective components of $(\underline{\lambda}_0, \phi_0)$.

At block 60, a conditional exsspectation formula, well known to those skilled in the making of statistical inferences, is used to obtain an initial estimate of the x-vector. At block 65, technique of interative proportional fitting is used to refine the estimated x-victor in such a way that it satisfies Eq. A1. Each of blocks 40–65 will be described in further detail below.

1 INTRODUCTION

Research on computer network monitoring and management is exploding. A statistical perspective is needed for solving many of these problems either because the desired measurements are not directly available or because one is concerned about trends that are buried in notoriously noisy data. The problem we consider in this paper has both of these aspects: indirect measurements and a weak signal buried in high variability.

In a local area network (LAN), routers and switches direct traffic by forwarding data packets between nodes according to a routing scheme. Edge nodes directly connected to routers (or switches) are called origins or destinations, and they do not usually represent single users but rather groups of users or hosts that enter a router on a common interface. An edge node is usually both an origin and a destination depending on the direction of the traffic. The set of traffic between all pairs of origins and destinations is conventionally called a traffic matrix, but in this paper we usually use the term origin-destination (OD) traffic counts to be specific. On a typical network the traffic matrix is not readily available, but aggregated link traffic measurements are.

The problem of inferring the OD byte counts from aggregated byte counts measured on links is called network tomography by Vardi (1996). The similarity to conventional tomography lies in the fact that the observed link counts are linear transforms of unobserved OD counts with a known transform matrix determined by the routing scheme. Vardi (1996) studies the problem for a network with a general topology and uses an iid Poisson model for the OD traffic byte counts. He gives identifiability conditions under the Poisson model and discusses using the EM algorithm on link data to estimate Poisson parameters in both deterministic and Markov routing schemes. To mitigate the difficulty in implementing the EM algorithm under the Poisson model, he proposes a moment method for estimation and briefly discusses the normal model as an approximation to the Poisson. Tebaldi and West (1998) follow up with a Bayesian perspective and an MCMC implementation, but only deal with link counts from a single measurement interval. Vanderbei and Iannone (1994) apply the EM algorithm but also use a single set of link counts.

This paper focuses on time-varying network tomography. Based on link byte counts measured at the router interfaces and under a fixed routing scheme, the time-varying traffic matrix is estimated. The link counts are readily available through the Simple Network Management Protocol (SNMP) which is provided by nearly all commercial routers. The traffic matrix or OD counts, however, are not collected directly by most LANs. Such measurements typically require specialized router software and hardware dedicated to data collection. This is not practical for most networks. Nevertheless, network administrators often need to make decisions that depend on the traffic matrix. For example, if a certain link in the network is overloaded, one might either increase the capacity of that link or adjust the routing tables to make better use of the existing infrastructure. The traffic matrix can help determine which approach would be more effective and locate the source of unusually high traffic volumes. An Internet Service Provider can also use the traffic matrix to determine which clients are using their network heavily and charge them accordingly rather than using the common flat rate pricing scheme.

Two standard traffic measurements from SNMP are (1) incoming byte count, the numbers of bytes received by the router from each of the interfaces connected to network links; and (2) outgoing byte count, the numbers of bytes that the router sends on each of its link interfaces. We collect these incoming and outgoing link counts at regular five minute intervals from each of the routers in a local network at Lucent diagrammed in FIG. 1(*a*). The six boxes represent network routers. The oval is a switch with a similar function but no capabilities for data collection. Individual nodes hanging from the routers connect to subnetworks of users, other portions of the corporate network, shared backup systems, and so forth. A data packet originating, for example, from one of the Router1 nodes and destined for the public Internet would be routed from Router1 to the Suntch, to Router4, through the Firewall to Gateway and then to the Internet. A network routing scheme determines this path.

FIG. 1(*b*) illustrates the subnetwork around Router1. For severl reasons this paper uses this simple network as the main example to illustrate the methodologies. One reason is that we have access to the system management staff for gaining access to data and for understanding details of the network, and at the same time we have available validation data to check our estimates. Another reason for studying a small problem is that in larger networks, it often makes sense to group nodes and estimate traffic between node groups. In Section 6, we discuss how estimation for all OD pairs in a large network can be done via a series of smaller problems on aggregated networks. We do not mean to imply, however, that all realistic problems can be reduced to our 4×4 example. Additional work is needed to scale these methods up to work on larger networks.

Figure 2:
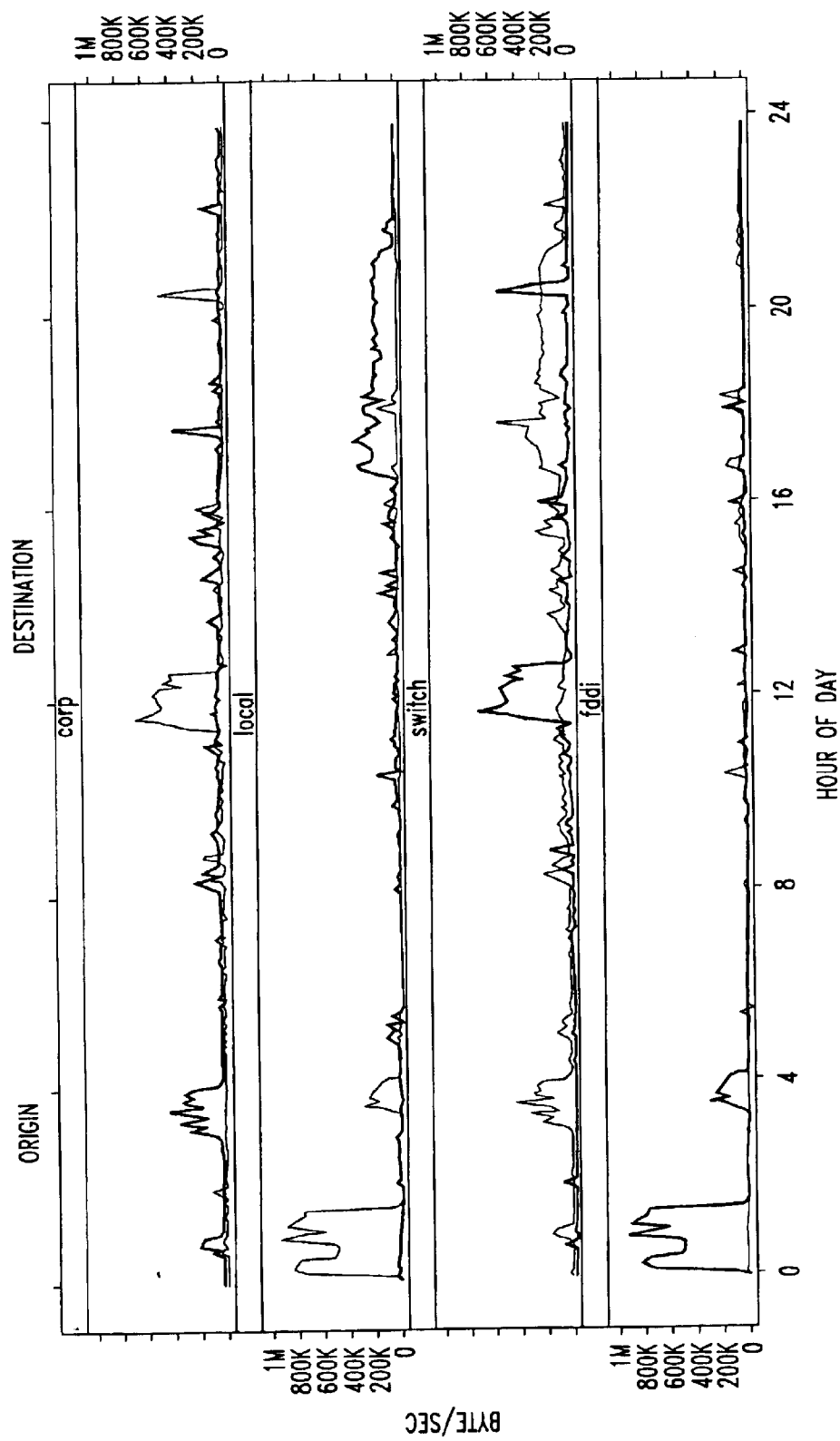
FIG. 2 is a set of link counts, shown varying over time, for the subnetwork of FIG. 1(b).

The 4 links on Router1 give rise to 8 link counts, with incoming and outgoing measurements for each interface. Time series plots of the link counts are shown in FIG. 2. The byte counts are highly variable as is typical for data network traffic. The traffic levels rise and fall suddenly and in ways that do not suggest stationarity. It is striking that a traffic pattern at an origin link interface can often be matched to a similar one at a destination interface and this can give a pretty good idea of where traffic flows. For example, origin local matches destination fddi at hour 1 and origin witch matches destination corp at hour 4. Such pattern matching may seem undemanding but the 4×4=16 OD count time series that we want to estimate are obviously not completely determined from the 8 observed link count series. There is often a large range of feasible OD estimates consistent with the observed link data. Our model-based estimates typically have have errors that are much less than these feasible ranges. Section 5 gives a specific example. Furthermore, visual pattern matching does not work well for the two-router network discussed in Section 6.

The rest of the paper is organized as follows. Section 2 gives a basic independent normal model for OD byte counts in which means and variances are functionally related through a power law. The section also proposes to estimate these counts using approximate conditional expectations given the link measurements, the estimated ML parameters, and the fact that the OD counts are positive. An iterative refitting algorithm ensures that estimates meet the routing constraints. Section 3 deals with the time-varying nature of traffic data by using a moving data window to fit the basic model locally and presents exploratory plots to show that the model assumptions are plausible for our example data. Section 4 develops a refinement of the moving iid model by supplementing the moving window likelihood with an adaptive prior distribution which is derived from modeling the parameter changes using independent random walks. Estimates from this model are then validated in Section 5 using direct measurements of OD byte counts obtained by running specialized software on the router and dumping data to a nearby workstation. Section 6 provides a brief application of our methods to a two-router network. Section 7 concludes with directions for further work.

2 NORMAL MODEL AND ESTIMATION METHODS

2.1 Basic Model

In this section we describe a model for a single vector of link counts measured at a given time; the counts at time t reflect the network traffic accruing in the unit interval (eg. a 5 minute interval) ending at t. Subsequently, in Section 2.3, we discuss fitting this model to a sample of such link count vectors measured over successive time intervals.

Let $x_t = (x_{t,1}, \ldots, x_{t,I})'$ denote the vector of unobserved link counts (average number of bytes per second, for example) of all OD pairs in the network at a given time t. In the Router1 network, $x_t$ has I=16 elements. One element, for example, corresponds to the number of bytes originating from local and destined for switch. Although we have used the customary terminology "traffic matrix," it is convenient to arrange the quantities for OD pairs in a single vector, $x_t$.

Let $Y_t = (y_{t,1}, \ldots, y_{t,J})'$ be the vector of observed incoming and outgoing byte counts at each router link interface. For example, one element of $Y_t$ corresponds to the number of bytes originating from local regardless of their destination. With 4 nodes, there are 4 incoming links and 4 outgoing links. In principle, the router is neither a source nor a destination. This implies that the total count of incoming bytes should be equal to the total count of outgoing bytes and thus the 8 link counts are linearly dependent. To avoid redundancies we remove the outgoing link count for the 4th interface, leaving J=7 linearly independent link measurements.

In general, each element of $Y_t$ is a sum of certain elements of $x_t$ with the exact relationship determined by the routing scheme. In matrix notation, these relationships are expressed as $$y_t = Ax_t,$$

where A is a J×I incidence matrix embodying the routing scheme. Typically J is much less than I because there are many more node pairs than links. Each column of A corresponds to an OD pair and indicates which links are used to carry traffic between that pair of nodes. We assume A to be fixed and known.

In the case of the single-router network around Router1 as shown in FIG. 1(b), the routing matrix has entries of 0 except in the places indicated below $$A = \begin{array}{r} \text{orig-1} \\ \text{orig-2} \\ \text{orig-3} \\ \text{orig-4} \\ \\ \text{dst-1} \\ \text{dst-2} \\ \text{dst-3} \end{array} \begin{pmatrix} 1 & 1 & 1 & 1 & & & & & & & & & & & & \\ & & & & 1 & 1 & 1 & 1 & & & & & & & & \\ & & & & & & & & 1 & 1 & 1 & 1 & & & & \\ & & & & & & & & & & & & 1 & 1 & 1 & 1 \\ 1 & & & & 1 & & & & 1 & & & & 1 & & & \\ & 1 & & & & 1 & & & & 1 & & & & 1 & & \\ & & 1 & & & & 1 & & & & 1 & & & & 1 & \end{pmatrix}$$

Columns are associated with OD pairs. The second column, for example, is for origin 1 and destination 2. The first row of the equation $Y_t = Ax_t$ corresponds to the statement that the observed byte count for traffic arriving on interface 1 is equal to the sum of the unobserved counts for traffic originating at node 1 and destined for nodes 1, 2, 3, and 4.

The unobserved OD byte counts, $x_t$ at time t are modeled as a vector of independent normal random variables $$y_t \sim \text{normal}(\lambda, \Sigma), \tag{1}$$

implying that the observed link byte counts, $y_t$, have distribution $$y_t = Ax_t \sim \text{normal}(A\lambda, A\Sigma A'). \tag{2}$$

The parameters are $\lambda = (\lambda_1, \ldots, \lambda_I)', \lambda_i > 0$ and $$\Sigma = \phi \, \text{diag}(\sigma^2(\lambda_1), \ldots, \sigma^2(\lambda_I)), \tag{3}$$

where $\phi > 0$ is a scale parameter and the function $\sigma^2(\cdot)$ describes a relationship which is assumed to be known between the mean and variance. Although $\Sigma$ depends on $\lambda$ and $\phi$, we suppress this from the notation. Equations (1)–(3) define the general model, but this paper concentrates on a specific power law form for $\sigma^2$:

$$\sigma^2(\lambda) = \lambda^c \tag{4}$$

where c is a constant.

The normal approximation to the Poisson model mentioned by Vardi (1996) is the special case $\phi=1$ and $c=1$. It is necessary, however, to account for extra Poisson variability in our byte count data. Section 3.2 presents some exploratory data analysis suggesting that the power law (4) controls the relation between mean and variance. We regard $\phi$ primarily as a nuisance parameter to account for extra Poisson variation; but a change in $\phi$ can also be used to accommodate a change of the units of traffic measurements from "bytes" to "bytes/sec" which may be more intuitive to system administrators. In other words, our model is scale-invariant while the Poisson model is not. The power c is not formally estimated in our approach, but Section 3 shows how to select a reasonable value and demonstrates the differences between two choices: $c=1$ and 2.

Normal distributions describe continuous variables. Given the high speed of today's network and 5 minute measurement intervals, the discreteness of byte counts can be ignored. However, the normal model is only an approximation if only for the reason that $x_t$ is positive. But if $x_t$ is Poisson distributed with a relatively large mean, then the approximation is good. Working in the normal family obviously makes the distribution of observation $Y_t$ easy to handle and leads to computational efficiency as we shall see below. Subsection 3.2 explores model assumptions for our data.

2.2 Identifiability

Model (2)–(4) with a fixed power c is identifiable. This is stated in the following theorem and corollary. Proofs are given in Appendix A.

Theorem 2.1 Let B be the $[J(J+1)/2]\times I$ matrix whose rows are the rows of A and the component-wise products of each different pair of rows from A. Model (2)–(4) is identifiable if and only if B has full column rank.

Corollary 2.2 For byte counts from router interface data, B has full column rank and thus model (2)–(4) is identifiable.

An intuitive explanation of the identifiability for the router interface data follows from hints that surface in the proof of the corollary. For the ith origin-destination pair, let $y_o$ represent the number of incoming bytes at the origin interface and let $Y_d$ represent the number of outgoing bytes at the destination interface. The only bytes that contribute to both of these counts are those from the ith OD pair, and thus $Cov(y_o, y_d) = \phi \lambda_i^c$. Therefore $\lambda_i$ is determined up to the scale $\phi$. Additional information from $E(y_t)$ identifies the scale and identifiability follows. A similar reasoning justifies Vardi's moment estimator of $\lambda$.

2.3 Estimation of $\lambda$ Based on IID Observations

The basic model given by (2)–(4) is identifiable, but reasonable estimates of the parameters require information to be accumulated over a series of measurements. We now describe a maximum likelihood analysis based on T iid link measurement vectors $Y=(y_1, \ldots, y_T)$ to infer the set of OD byte count vectors $X=(x_1, \ldots, x_T)$. This simple iid model forms the basis for time-varying estimates in Section 3 where we apply it locally to byte count vectors over a short windows of successive time points.

Under assumption (2) and for $\theta=(\lambda,\phi)$, the log likelihood is $$l(\phi|Y) = -\frac{T}{2}\log|A\Sigma A'| - \frac{1}{2}\sum_{t=1}^{T}(y_t - A\lambda)'(A\Sigma A')^{-1}(y_t - A\lambda).$$

Let $W = A'(A\Sigma A')^{-1}A$ with the ijth element $w_{ij}$, and $\dot{\sigma}_i^2$ and $\ddot{\sigma}_i^2$ respectively denote the first and second derivatives of $\sigma^2(\lambda)$ evaluated at $\lambda_i$. Under assumption (4), $$\dot{\sigma}_i^2 = c\lambda_i^{c-1}, \quad \ddot{\sigma}_i^2 = c(c-1)\lambda_i^{c-2}.$$

The $I \times I$ Fisher information matrix $-E(\partial^2 l/\partial\lambda^2)$ for $\lambda$ has entries:

$$-E\left(\frac{\partial^2 l}{\partial \lambda_i \partial \lambda_j}\right) = T\left(\omega_{ij} + \frac{1}{2}\phi^2\dot{\sigma}_i^2\dot{\sigma}_j^2\omega_{ij}^2\right), \quad (5)$$

which provides insight into the source of information in estimating $\lambda$. The first term is the information about $\lambda$ that would come from a model in which $\Sigma$ had no relation to $\lambda$. The second term brings in the additional information about $\lambda$ that is provided by the covariance of $y_t$. Because rank(W)=rank(A) and A is generally far from full column rank, the Fisher information matrix about $\lambda$ would be singular without the second term of (5). Thus, it is the covariance of $y_t$ that provides the crucial information needed in estimating $\lambda$. This is reminiscent of the role that the covariance played in proving identifiability. In fact, it can be proved that the matrix with entries $w_{ij}^2$ is positive definite as long as $\lambda>0$ and this implies the Fisher information matrix is non-singular.

Because $\Sigma$ is functionally related to $\lambda$ there are no analytic solutions to the likelihood equations. We turn to derivative-based algorithms to find the maximum likelihood estimate (MLE) of the parameters $\phi$ and $\lambda$ subject to the constraints $\phi>0$ and $\lambda>0$. We find it useful to start the numerical search using the EM algorithm (Dempster et al., 1977), with the complete data defined as the T unobserved byte count vectors $X=(x_1, \ldots, x_T)$ of the OD pairs. Note that the complete data log-likelihood is the familiar normal form $$l(\theta|X) = -\frac{T}{2}\log|\Sigma| - \frac{1}{2}\sum_{t=1}^{T}(x_t - \lambda)'\Sigma^{-1}(x_t - \lambda).$$

Let $\theta^{(k)}$ be the current estimate of the parameter $\theta$. Quantities that depend on $\theta^{(k)}$ are denoted with a superscript (k). The usual EM conditional expectation function Q is $$Q(\theta, \theta^{(k)}) = E(l(\theta|X)|Y, \theta^{(k)})$$

$$= -\frac{T}{2}(\log|\Sigma| + tr(\Sigma^{-1}R^{(k)})) - \frac{1}{2}\sum_{t=1}^{T}(m_t^{(k)} - \lambda)'\Sigma^{-1}(m_t^{(k)} - \lambda),$$

where $$m_t^{(k)} = E(x_t|y_t, \theta^{(k)}) = \lambda^{(k)} + \Sigma^{(k)}A'(A\Sigma^{(k)}A')^{-1}(y_t - A\lambda^{(k)}),$$

$$R^{(k)} = Var(x_t|y_t, \theta^{(k)}) = \Sigma^{(k)} - \Sigma^{(k)}A'(A\Sigma^{(k)}A')^{-1}A\Sigma^{(k)}, \quad (6)$$

are the conditional mean and variance of $x_t$ given both $Y_t$ and the current estimate $\theta^{(k)}$. To complete the M step, we need to maximize the Q function with respect to $\theta$. Let $$a_i^{(k)} = r_{ii}^{(k)} + \frac{1}{T}\sum_{t=1}^{T}\left(m_{t,i}^{(k)}\right)^2, \quad b_i^k = \frac{1}{T}\sum_{t=1}^{T}m_{t,i}^{(k)}.$$

It can be shown that equations $\partial Q/\partial\theta = 0$ are equivalent to $$\begin{cases} 0 = c\phi\lambda_i^c + (2-c)\lambda_i^2 - 2(1-c)\lambda_i b_i^{(k)} - ca_i^{(k)}, \quad i=1,\ldots,I \\ 0 = \sum_{i=1}^{r}\lambda_i^{-c+1}\left(\lambda_i - b_i^{(k)}\right) \end{cases} \quad (7)$$

The quantities $\lambda_i^{(k)}$ are non-negative by definition and, with this in mind, it is straightforward to show that nonnegative solutions $\lambda$ and $\phi$ to equation (7) always exist, even though they must generally be found numerically. Let $f(\theta) = (f_1(\theta), \ldots, f_{I+1}(\theta))$ be the right-hand sides of the above equations. We shall use the one-step Newton-Raphson algorithm to update $\theta^{(k)}$ (Lange, 1995):

$$\theta^{(k+1)} = \theta^{(k)} - [\dot{F}(\theta^{(k)})]^{-1}f(\theta^{(k)}),$$

where $\dot{F}$ is the Jacobian of $f(\theta)$ with respect to $\theta$:

$$\frac{\partial f_i}{\partial \lambda_j} = \delta_{ij}\left(\phi c^2\lambda_i^{c-1} + 2(2-c)\lambda_i - 2(1-c)b_i^{(k)}\right), \quad \frac{\partial f_i}{\partial \phi} = c\lambda_i^c, \quad i=1,\ldots,I$$

$$\frac{\partial f_{T+1}}{\partial \lambda_j} = (2-c)\lambda_i^{1-c} - (1-c)\lambda_i^{-c}b_i^{(k)}, \quad \frac{\partial f_{T+1}}{\partial \phi} = 0.$$

In general the Newton-Raphson steps do not guarantee $\theta^{(k)} > 0$ but in the special case of $c=1$ or $c=2$, given $\phi$, we can explicitly find a positive solution $\lambda$ to (7) and use fractional Newton-Raphson steps on $\phi$ when necessary to prevent negative solutions.

Convergence of the above modified EM algorithm has been proved (Lange, 1995). However, it is usually quite slow in practice due to the sub-linear convergence of the EM algorithm (Dempster et al., 1977). Second-order methods based on quadratic approximations of the likelihood surface have faster convergence rates. There are many such algorithms and we use the one in the S function ms (Chambers and Hastie, 1993) which is based on the published algorithm of Gay (1983). Our implementation uses analytical derivatives of the likelihood surface up to second order. Based on this information, the algorithm derives a quadratic approximation to the likelihood surface and uses a model trust region approach in which the quadratic approximation is only trusted in a small region around the current search point. With this algorithm, as with the EM algorithm, the likelihood function increases at each subsequent iteration. Since this algorithm is designed for unconstrained optimization, we reparameterize the likelihood function using $\eta = (\log(\lambda), \log(\phi))$ and supply to ms the first derivatives and second derivatives in terms of $\eta$. We summarize the numerical algorithm as follows: (i) Initialize $\theta = \theta_0$; (ii) Update $\theta$ using Newton Raphson EM steps until the change in $l(\theta)$ is small; (iii) Update $\theta$ using a second order method (like ms in S) until convergence is declared.

The choice of starting point is fairly arbitrary for the EM iterations. For $\lambda$, we use a constant vector in the center of the region; that is, $\lambda_0 = a_0\mathbf{1}$ where $a_0$ solves $\mathbf{1}'A\lambda_0 = \mathbf{1}'\Sigma_1^T y_t/T$. In the case of $c=1$, $\phi = \text{Var}(y_{t,j})/E(y_{t,j})$ for any $j=1,\ldots,J$. A moment estimator based on this is used for the starting value of $\phi$; similar ideas are used to give starting values of $\phi$ in general cases of c. Our experience is that this easily computed starting point gives stable performance. A more complex choice is to use a moment estimator like that proposed by Vardi (1996), but for the mean variance relation (4). Computations take 6 seconds per MLE window on the Router1 network with 16 OD pairs using Splus 3.4 on a shared SGI Origin 2000 with 200 MHZ processors. The computations to produce FIG. 5, for example, take 30 minutes. This could be reduced considerably by computing in a compiled language such as C.

2.4 Estimation of X Based on IID Observations

If $\phi$ is known, then $E(X|Y, \theta, X>0)$ has minimum mean square prediction error for estimating X. Conditioning on $X>0$ safeguards against negative estimates. When $\phi$ is unknown, a natural alternative is $$\hat{X} = E(X|Y, \theta = \hat{\theta}, X>0),$$

where $\hat{\theta}$ is the M.L.E. of $\theta$ based on Y. Because the samples are independent the nth column of $\hat{X}$ is equal to $$\hat{x}_t = E(x_t|y_t, \hat{\theta}, x_t>0). \quad (8)$$

But $[x_t|y_t, \hat{\theta}]$ is multivariate normal, and thus computing $\hat{x}_t$ generally requires multidimensional integration over the positive quadrant. To avoid this, we reason as follows: if the normal approximation for $x_t$ is appropriate, the positive quadrant will contain nearly all the mass of the distribution of $[x_t|y_t, \hat{\theta}]$ and thus conditioning on $x_t>0$ has little effect. The more crucial matter is to satisfy the constraint $A\hat{x}_t = y_t$, for which an iterative proportional fitting procedure is well suited. It is natural to ask here whether this summation constraint together with the positivity constraint would be adequate to determine $\hat{x}_t$ without our proposed statistical model. The answer is in general no and we will come back to this point in the validation section 5.

Iterative proportional fitting is an algorithm widely used in the analysis of contingency tables. It adjusts the table to match the known marginal totals. The algorithm and its convergence have been the subject of extensive study (Ireland and Kullback, 1968; Ku and Kullback, 1968; Csiszár, 1975). For a one-router network, the linear constraints $Ax_t = Y_t$ with positive $x_t$ can be re-expressed in a contingency table form if we label the table in both directions by the nodes in the network, with the rows as the origin nodes and the columns as destinations. Each entry in the table represents the byte count for an OD pair. In this case, the constraint translates exactly into column and row margin summation constraints. For general networks, $Ax_t = y_t$ corresponds to further summation constraints beyond the marginal constraints, but the iterative proportional fitting algorithm can easily deal with these additional constraints in the same way as the marginal constraints. As long as the space $\{x_t: y_t = Ax_t, x_t \propto 0\}$ is not empty, positivity of the starting point is a sufficient condition for convergence.

To give a positive starting value, we use a component-wise version of (8)

$$\hat{x}_{t,i}^{(0)} = E(x_{t,i}|y_t, \hat{\theta}, x_{t,i}>0), i=1,\ldots,I \quad (9)$$

and then we adjust the resulting vector $\hat{x}_t^{(0)} = (\hat{x}_{t,1}^{(0)}, \ldots, \hat{x}_{t,I}^{(0)})$ using an iterative proportional fitting procedure to meet the constraint $A\hat{x}_t = y_t$. The quantities $\hat{x}_{t,i}^{(0)}$ can be computed based on the following easily derived formula for a Gaussian variate $Z \sim \text{normal}(\mu, \sigma^2)$: $E(Z|Z>0) = \mu + \sigma/\sqrt{2\pi}\exp(-\mu^2/(2\sigma^2))\Phi^{-1}(\mu/\sigma)$, where $\Phi(\cdot)$ is the standard normal cumulative distribution. The conditional mean and variance of $[x_{t,i}|y_t, \hat{\theta}]$ can be found using (6).

Our iterative proportional fitting procedure starts with $\hat{x}_t^{(0)}$ from (9) and then sweeps cyclically through the constraint equations as follows. For each row $a_j$ of A obtain $\hat{x}_t^{(j)}$ by multiplying the components of $\hat{x}_t^{(j)}$ corresponding to nonzero elements of $a_j$ by the factor $y_{t,j}/a_j\hat{x}_t^{(j-1)}$. Here superscripts of $\hat{x}_t$ are interpreted modulo J. Convergence is declared when all constraints are met to a given numerical accuracy.

3 A MOVING IID MODEL FOR TIME SERIES DATA

Recall from FIG. 2 that the links exhibit outbursts of traffic interleaved with low activity intervals. Changes in the local average byte counts are obvious and a time-varying approach is needed to model this data.

3.1 A Local iid Model

To allow for parameters that depend on t, the basic iid model is extended to a local iid model using a moving window of a fixed size w=2h+1, where h is the half-width. For estimation at time t, the window of observations centered at t are treated as iid:

$$y_{t-h}, \ldots, Y_{t+h} \sim \text{iid normal}(A\lambda_t, A\Sigma_t A') \quad (10)$$

where $E_t = \phi_t \text{diag}(\lambda_t^c)$. This is the moving iid version of model (2)–(4) and the methods of the previous section are used to obtain estimates $\lambda_t$ and $x_t$. Because consecutive windows are overlapping, estimates $\hat{\lambda}_t$ and $\hat{x}_t$ are implicitly smoothed.

The iid assumption for consecutive $x_t$ vectors within a window is approximate with respect to both independence and identical distributions. The assumption makes our method simple. By choosing a relatively small window size, the method can effectively adapt to the time-varying nature of the data. A moving window approach formally falls under local likelihood analysis (Hastie and Tibshirani, 1990; Loader, 1999), with a rectangular weight function. Within that framework, equation (10) can be justified as a local likelihood approximation to a time-varying model with observations that are independent over time.

3.2 Exploratory Analysis and Model Checking

Before estimating parameters in the Router1 network, we do some exploratory analysis to check appropriateness of the various assumptions made about $x_t$. Since $x_t$ is not observed, however, these checks must be based only on $y_t$. In what follows, $m_t$ and $s_t$ denote the expected value and component-wise standard deviation of $y_t$.

IID Normality. Using the switch link as a representative interface, FIG. 3 shows normal probability plot (left) and time series plot (right) for standardized residuals of byte counts originating at switch. The vector of residuals for all links at time t is defined as $\hat{e}_t = (Y_t - \hat{m}_t)/\hat{s}_t$ where $\hat{m}_t$ and $\hat{s}_t$ are the sample mean and standard deviation over a window of size 11 centered at t. Each element of $\hat{e}_t$ should be approximately iid normal over time. The probability plot is somewhat concave and this is typical of the other links as well, implying that the actual count distributions have heavier upper tails than the normal. The agreement is sufficient, however, for a normal-based modeling approach to be meaningful.

Independence over time is regarded as an effective assumption and the time-series plot of residuals in the right-hand panel is meant only to check for gross violations. For a small window size, the link counts have more or less constant mean and variance unless the window happens to include an abrupt change for one or more links and in this case we have to live with the consequences of our model being wrong. This point is addressed further in Section 3.3. Large windows including several days, for example, might contain diurnal patterns that would render the iid assumption unreasonable. With w=11 corresponding to a 55 minute window, the local dependence is negligible.

Window size. In Section 3.3 to follow, the window choice is w=11. Windows of 5 and 21 yielded similar final results. It is possible to follow the guidelines in Loader (1999) to choose the window size via cross validation (CV) to minimize the mean square estimation error for $x_t$ but we have not done this.

Variance-mean relationship. Identifiability requires a relation between the mean and variance of OD byte counts. If the relation is unknown, however, uncovering it remains difficult. In Section 2, we proposed a power relation as a simple extension to the Poisson count model that allows over-dispersion and a super-linear increase in the variance with the mean. We now attempt to check this assumption.

Figure 4:
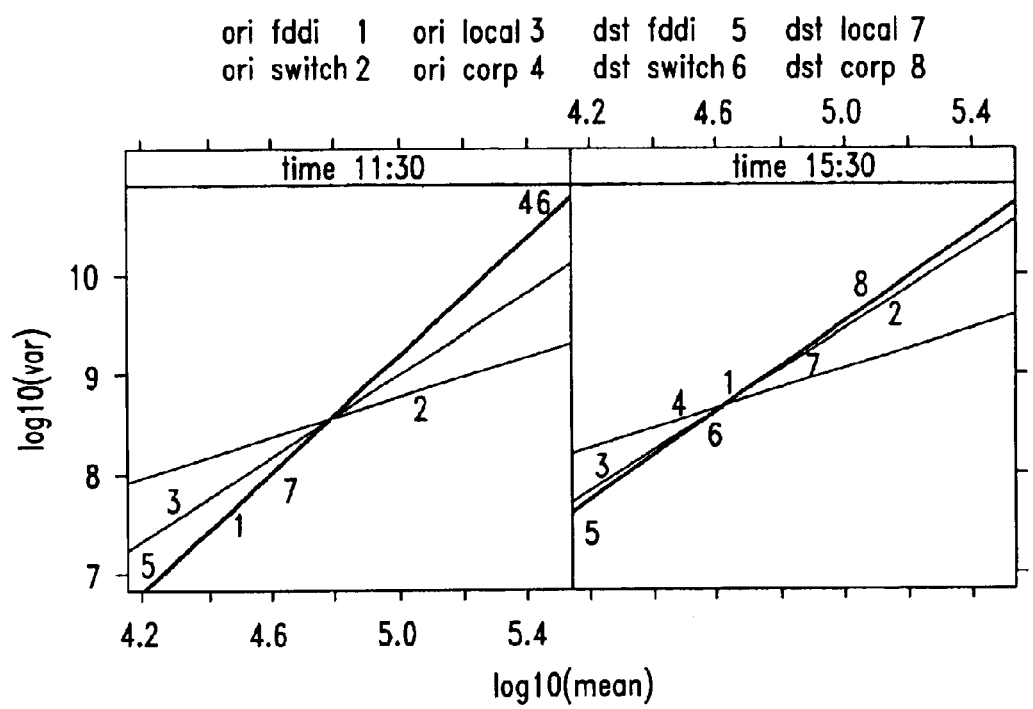
FIG. 4 is a pair of plots of local variances versus local means for an illustrative set of link counts.

FIG. 4 plots $\log \hat{s}_{t,j}^2$ against $\log \hat{m}_{t,j}$ (j=1, ..., 8) using the local averages and standard-deviations described above for checking the normal assumption. The two panels represent windows centered at different time periods: t=11:30 AM and 3:30 PM. Each point in the plot represents a given network link. According to the arguments that follow, a power relation $\Sigma_t = \phi_t \text{diag}(\lambda_t^c)$ will tend to produce a linear plot with slope equal to c. Rough linearity is evident in the figure and slopes of the solid fitted lines indicate that a quadratic power law (c=2) is more reasonable than a linear law (c=1). The two panels shown are typical of most cases.

Suppose that only the first K OD pairs contribute significantly to the byte counts on the jth link at time t. Then for $c \geq 1$ and $K \geq 1$, $$K^{1-c}(\lambda_1 + \ldots + \lambda_K)^c \leq \lambda_1^c + \ldots + \lambda_K^c \leq (\lambda_1 + \ldots + \lambda_K)^c.$$

Thus, the variance $s_{t,j}^2$ and mean $m_{t,j}$ of the byte counts for link j satisfy $$\log s_{t,j}^2 = \log \phi + c \log m_{t,j} + a_{t,j}$$

where $a_{t,j}$ is bounded between zero and $(1-c) \log K$. If byte counts on most of the link interfaces are dominated by a few OD pairs, then $(1-c) \log K$ is likely to be small in comparison to the variation of $c \log m_{t,j}$ and thus $\log s_{t,j}^2$ will be approximately linear in $\log m_{t,j}$ with a slope c. When c=1, $a_t = 0$ and this linearity holds exactly.

It may be possible to estimate c directly from the data but identifiability for this general case model is not obvious. Therefore we select a value for c from from a limited number of candidates. Since these models all have the same complexity, our selection procedure compares the maximum log-likelihood for each window and selects the one that on average gives the largest maximum log-likelihood.

3.3 Local Fits to Router1 Data

Estimates of $\lambda$. We fit models with c=1 and c=2 using a moving window of width w=11. Comparing the fits, 98% of windows give larger likelihood for c=2 even though the difference in fit is typically small.

Figure 5A:
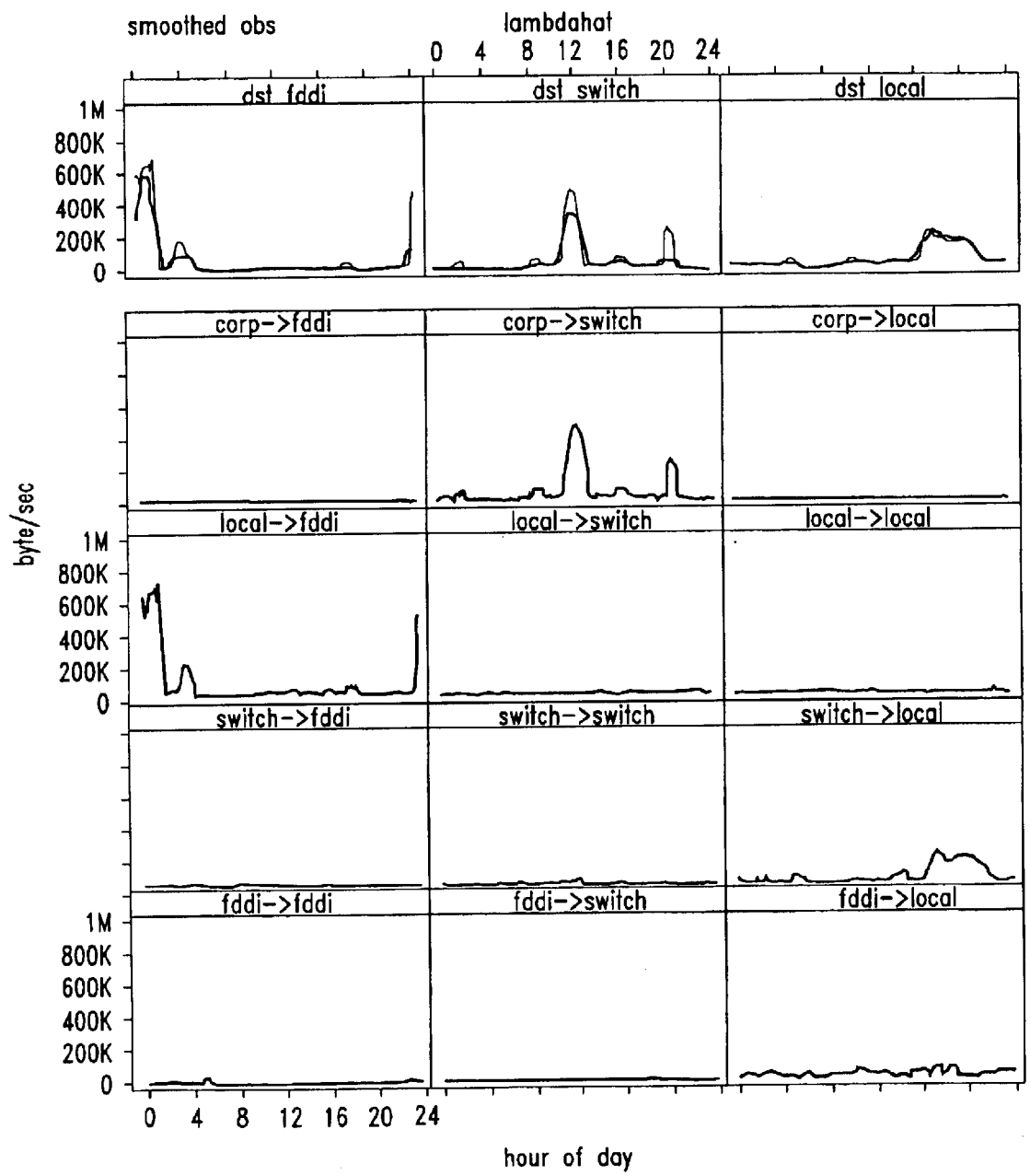
FIG. 5 is a plot of mean traffic estimates of OD pairs versus time, obtained using a moving window in accordance with the invention in one embodiment.
Figure 5B:
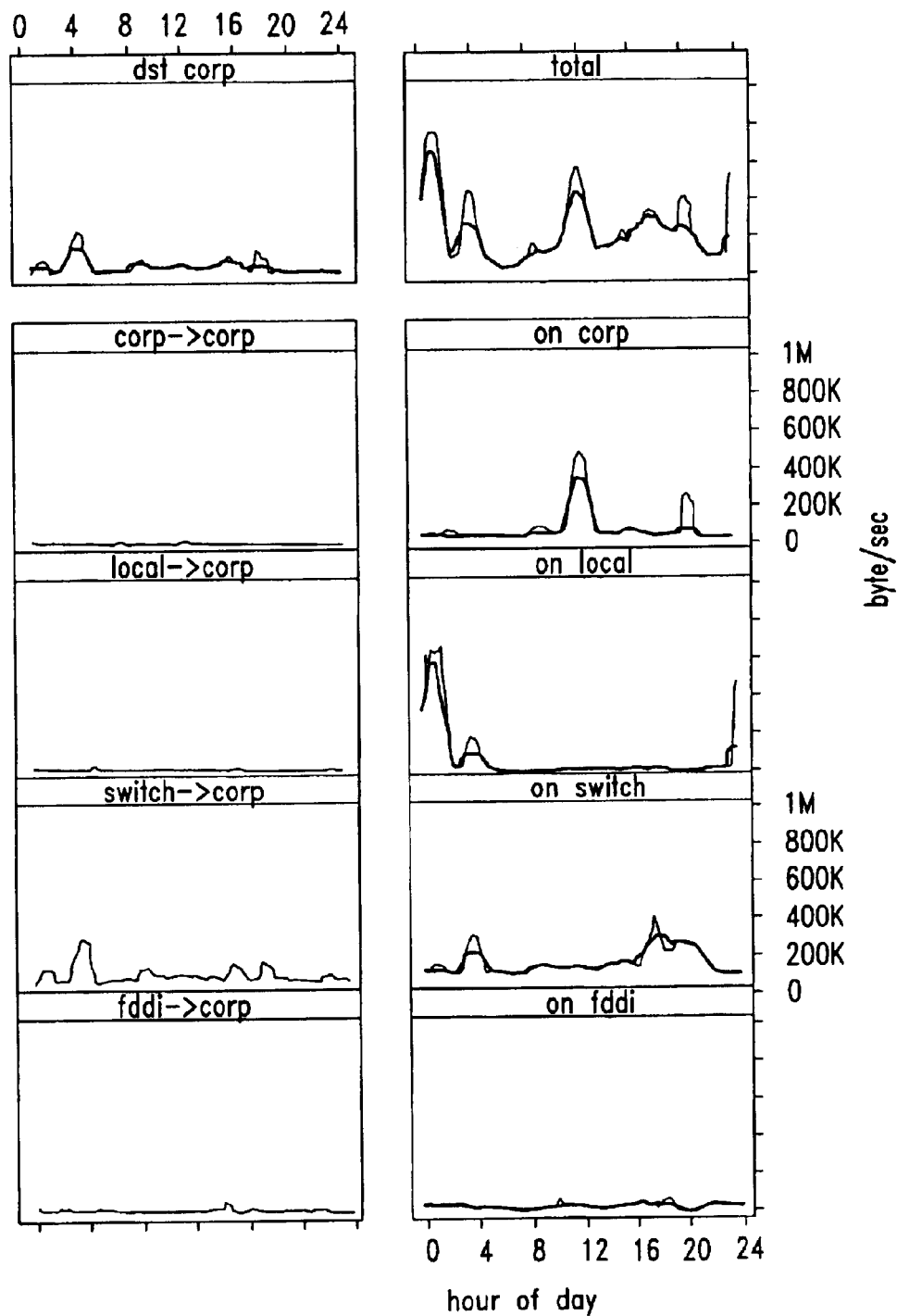

FIG. 5 plots estimates of $\lambda$ (gray) for the Router1 network. For comparison, the top and right marginal panels also show 11-point moving averages of the observed byte counts $\overline{Y}_t$ in black. Obviously, these moving averages do not rely on a relation between mean and variance, but they are, nevertheless, in general agreement with the model-based estimates. If the match was poor, we would question the power-law specification. The model-based margins are more variable the moving averages. This is most obvious at the high peaks in FIG. 5 but magnifying the vertical scale by a factor of 20 (not shown) would demonstrate that the difference in smoothness holds at smaller scales as well. Discussion of estimates $\hat{x}_t$ is deferred to Section 5 after the modeling refinements of Section 4.

Difficulties with strictly local fitting. An intrinsic problem with fitting a large number of parameters using a small moving window is that the likelihood surface can have multiple local maxima and can be poorly conditioned in directions where the data contains little information on the parameters. This can lead to estimation inaccuracies and numerical difficulties. Some of the smaller scale variations of $\hat{\lambda}_t$ in FIG. 5 are likely due to poor conditioning.

An example of a numerical problem comes when the iterative procedure for estimating $\lambda_t$ converges to a boundary point in which some components are zero. Since estimation is done in terms of log $\lambda_t$, the likelihood surface is flat in directions corresponding to zeros. Additional singularity arises when the number of nonzero components becomes smaller than the number of independent link interfaces.

The following section presents a refinement to the local model with the intent of overcoming numerical problems and, more importantly, improving estimation accuracy in parameter directions that are poorly determined from small data windows. Our approach encourages smoother parameter estimates by borrowing information from neighboring data windows through the use of a prior derived from previous estimates. The refinement is especially useful for large networks with many more parameters than observed link interfaces.

4 ADDITIONAL SMOOTHING BY MODELING $\lambda_t$

Let $\eta_t = (\log(\lambda_t), \log(\phi_t))$ be the log of the parameter time series. We model $\eta_t$ as a multi-dimensional random walk:

$$\eta_t = \eta_{t-1} + v_t, \quad V_t \sim \text{normal}(0, V), \tag{11}$$

where V is a fixed variance matrix chosen beforehand. Equations (11) and (10) compose a state-space model for $Y_t = (y_{t-h}, \ldots, y_t, \ldots, y_{t+h})$. The choice of V is important because it determines how much information from previous observations carries over to time t. Let $\overline{Y}_t = (y_1, \ldots, y_{t+h})$ be all the observations up to time t+h, then $$p(\eta_t|\overline{Y}_t) = p(\eta_t|\overline{Y}_{t-1}, Y_t) \propto p(\eta_t|\overline{Y}_{t-1}) p(Y_t|\eta_t).$$

Thus, maximizing the posterior $p(\eta_t|\overline{Y}_t)$ is equivalent to maximizing log-likelihood with an additive penalty corresponding to the adaptive log-prior on $\eta_t$ conditioned on past data. The penalty term conditions nearly flat directions on the original log-likelihood surface which can otherwise produce poor estimates of $\lambda$.

For the prior on $\eta_t$ we have $$p(\eta_t|\overline{Y}_{t-1}) \propto \int p(\eta_{t-1}|\overline{Y}_{t-1}) p(\eta_t|\eta_{t-1}) d\eta_{t-1}.$$

but to relieve computational burden, we approximate the posterior $p(\eta_{t-1}|\overline{Y}_{t-1})$ at t−1 by normal$(\hat{\eta}_{t-1}, \hat{\Sigma}_{t-1})$, where $\hat{\eta}_{t-1}$ is the posterior mode and $\hat{\Sigma}_{t-1}$ is the inverse of the curvature of the log posterior density at the mode (Gelman et al., 1995). Hence, $p(\eta_t|\overline{Y}_{t-1})$ can be approximated by normal$(\hat{\eta}_{t-1}, \hat{\Sigma}_{t-1}+V)$. With this prior, optimization of $p(\eta_t|\overline{Y}_t)$ can be handled in a manner similar to that outlined in Section 2.3. For the EM algorithm, the Q function is modified by including an extra constant term from the prior and hence only the M step has to be changed. If the EM algorithm is used only to provide a good starting point for a second order method, it may not even be necessary to modify the M step. To use a second order optimization routine (like ms in S), all the derivative calculations are modified by including the derivatives of the log-prior, log $(p(\eta_t|\overline{Y}_{t-1}))$, and hence can be carried out just as easily as before. As an end result, using a normal approximation to the adaptive prior adds almost no additional computational burden for parameter estimation. The final algorithm is as follows.

1. Initialize t=h+1, $\hat{\eta}_{t-1} = \eta_0$ and $\hat{\Sigma}_{t-1} = \Sigma_0$.
2. Let $\hat{\Sigma}_{t|t-1} = \hat{\Sigma}_{t-1} + V$ and $\pi(\Theta_t) = p(\eta_t|\overline{Y}_{t-1}) \sim \text{normal}(\hat{\eta}_{t-1}, \hat{\Sigma}_{t|t-1})$ be the prior of $\eta_t$ given observations $\overline{Y}_{t-1}$.
3. Let $g(\eta_t) = \log\pi(\eta_t) + \log p(Y_t|\eta_t)$ be the log of the posterior distribution of $\eta_t$.
   Find the mode $\hat{\eta}_t = \arg\max g(\eta_t)$ using optimization method. Note that derivatives of g are $\dot{g}(\eta_t) = -\hat{\Sigma}_{t|t-1}^{-1}(\eta_t - \hat{\eta}_{t-1}) + \partial \log p / \partial \eta_t$, and $\ddot{g}(\eta_t) = -\hat{\Sigma}_{t|t-1}^{-1} + \partial^2 \log p / \partial \eta_t^2$.
4. Let $\hat{\Sigma}_t = \ddot{g}(\hat{\eta}_t)^{-1}$, t=t+1 and return to Step 2.

The proposed model and algorithm are similar to Kalman Filtering (Anderson and Moore, 1979) and Bayesian dynamic models (West and Harrison, 1997). The effect of the adaptive prior $\pi(\eta_t)$ on estimation and hence the smoothness is controlled by the size of V. If a relatively large V is chosen, $\pi(\eta_t)$ only plays a secondary role. In comparison, the choice of $\eta_0, \Sigma_0$ is less important in the sense that their effect dies out with time. In our implementation, both V and $\eta_0$ where set empirically from preliminary parameter estimates obtained in Section 2, and a large $\Sigma_0$ is chosen to reflect our poor prior knowledge at the start of estimation.

Figure 6B:
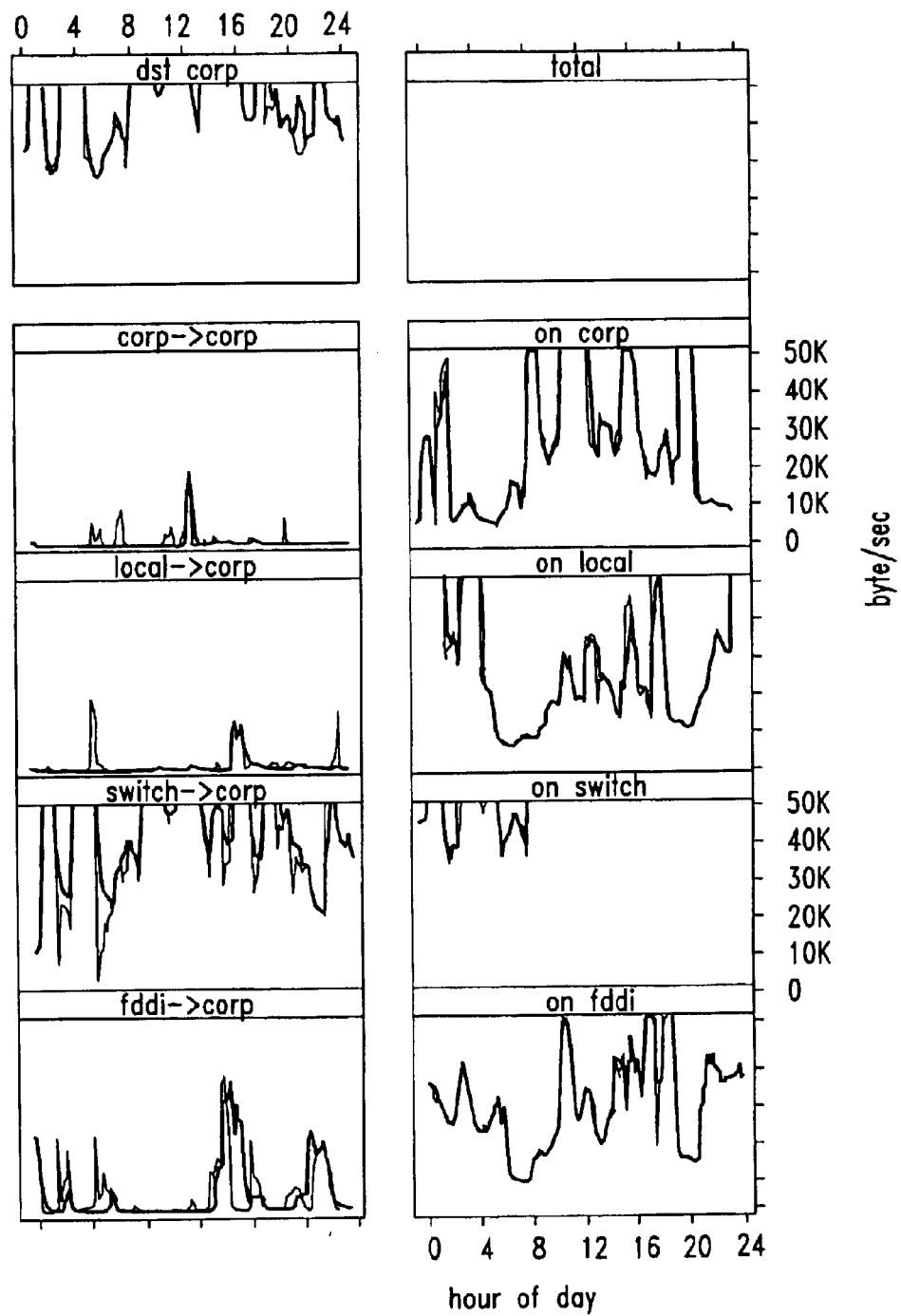
FIG. 6 is a plot of mean traffic estimates of OD pairs versus time, obtained both with and without the use of an adaptive prior, in accordance with alternate embodiments of the invention.

FIG. 6 shows estimates of $\lambda_t$ using the adaptive prior (black) and compares them to previous estimates (gray) with no prior. The vertical scale is magnified 20 times over that of FIG. 5. As desired, the prior-based estimates are clearly smoother than those from strict local fitting. Moreover, in the upper and right marginal panels, the marginal sums of the new estimates (black) are less variable than those of the old (gravy)

5 VALIDATION AGAINST ACTUAL OD COUNTS

The ultimate goal is to estimate the actual time-varying traffic, $x_t$, and assess the accuracy of these estimates as well as the fit of the model. But standard residual analyses are not available because $x_t$ is unobservable and the fitting procedure provides an exact fit to the link observations: $y_t - A\hat{x}_t = 0$. Thus, to validate the modeling approach, we have instrumented the Router1 network to directly measure complete OD byte counts $x_t$ and not merely link measurements $y_t$. This section compares estimates $\hat{x}_t$ with actual OD traffic.

Measuring OD traffic on a LAN generally requires special hardware and software. Router1 is a Cisco 7500 router capable of generating data records of IP (internet protocol) flows using an export format called netflow. These records were sent to a nearby workstation running cflowd software (CAIDA, 1999) that builds a database of summary information in real time. Finally, we ran aggregation queries on the flow database to calculate OD traffic matrices for the Router1 network. Queries were run automatically at approximate 5 minute intervals in an effort to match with the routine link measurements studied in previous sections.

In principle, marginal sums from the netflow data should match the link measurements over identical time intervals. Actual measurements inevitably have discrepancies due to timing variations and slight differences in how bytes are accumulated by the two measurement methods. Let $x_t$ represent OD traffic measured from netflow records for the 5 minute interval ending at time t. Link measurements corresponding to $x_t$ are calculated as $Y_t = Ax_t$ and then these are used to form estimates, $\hat{x}_t$, of the OD traffic. Fitted values in this section are based on the adaptive prior model of Section 4.

Figure 7B:
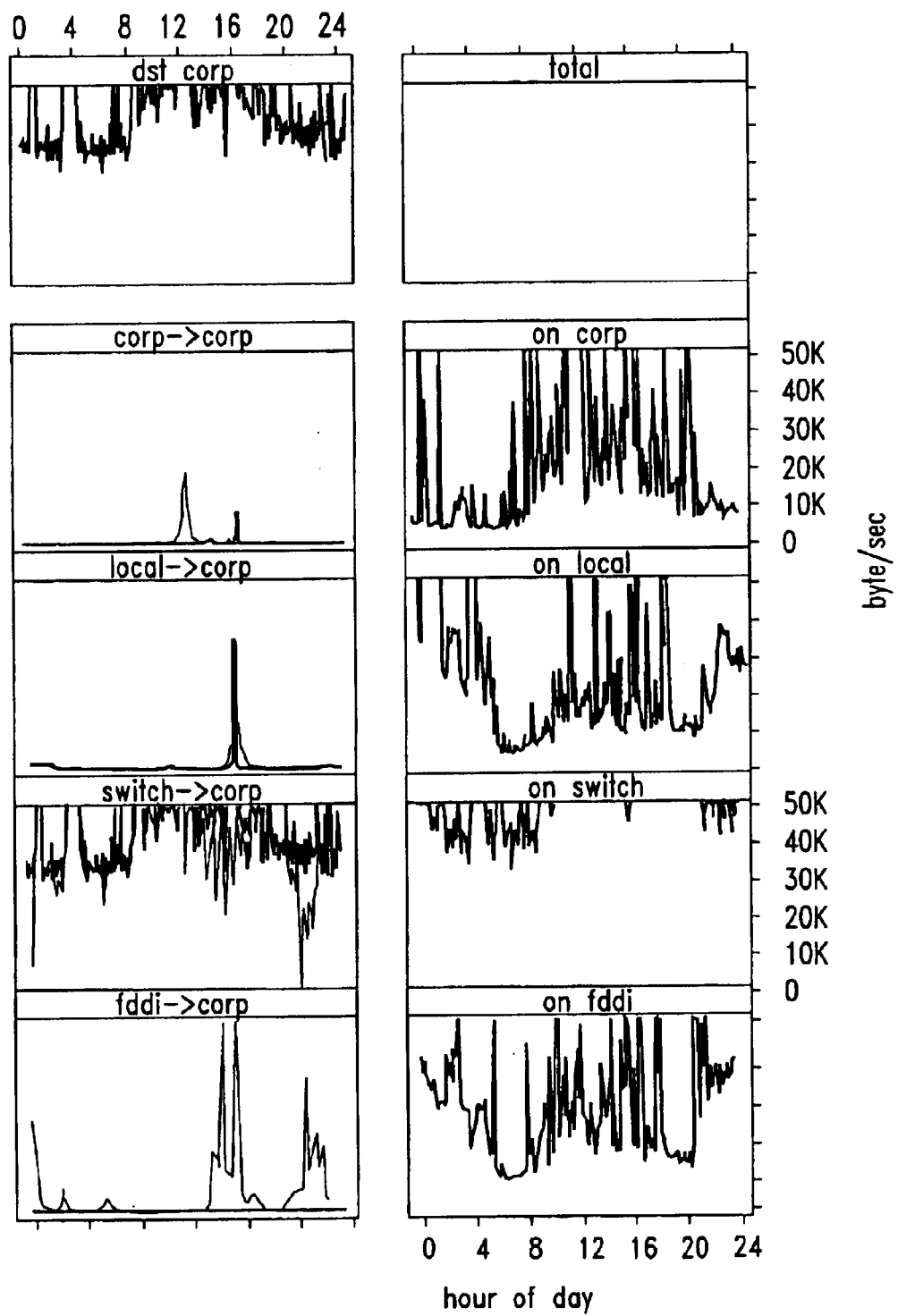
FIG. 7 is a comparison of OD counts measured directly in an illustrative network, versus counts predicted in the same network using techniques of the present invention.

Full scale plots (not shown) show excellent agreement between actual $x_t$ and predicted $\hat{x}_t$ OD traffic. Large OD flows, corresponding to periods of high usage, are estimated with very small relative error. A more critical view of the estimates is seen in FIG. 7 where the vertical axis is magnified by a factor of 20 so that the large well-estimated peaks are off-scale. The figure focuses on estimation errors for the smaller-scale features. In particular, we sometimes predict a substantial amount of traffic when the actual amount is zero. This is especially apparent in the lower right panel labeled fddi→corp where the traffic is greatly overestimated (relative to the actual low traffic). Due to the constraint that fitted margins must match the data, overestimates in one panel are compensated by underestimates in another. This produces a checkerboard pattern of estimation errors in which positive errors are balanced by negative errors in each row and column. Perhaps additional smoothing from the prior would be useful. We have considered setting the prior variances and local window width using a cross-validation approach but we have not pursued this possibility in depth.

Although estimation errors are sometimes large, the model-based estimates perform well when compared to the range of all possible OD estimates that are both nonnegative and consistent with the observed link data. As an example, at 3:30 AM we compute actual estimation errors for each of the 16 OD pairs and divide by the range of all possible estimates. Nine of these ratios are less than 0.14% and all are less than 8%. By this measure, the statistical model is contributing a tremendous amount to the estimation accuracy.

6 BEYOND ONE-ROUTER NETWORKS

Figure 8:
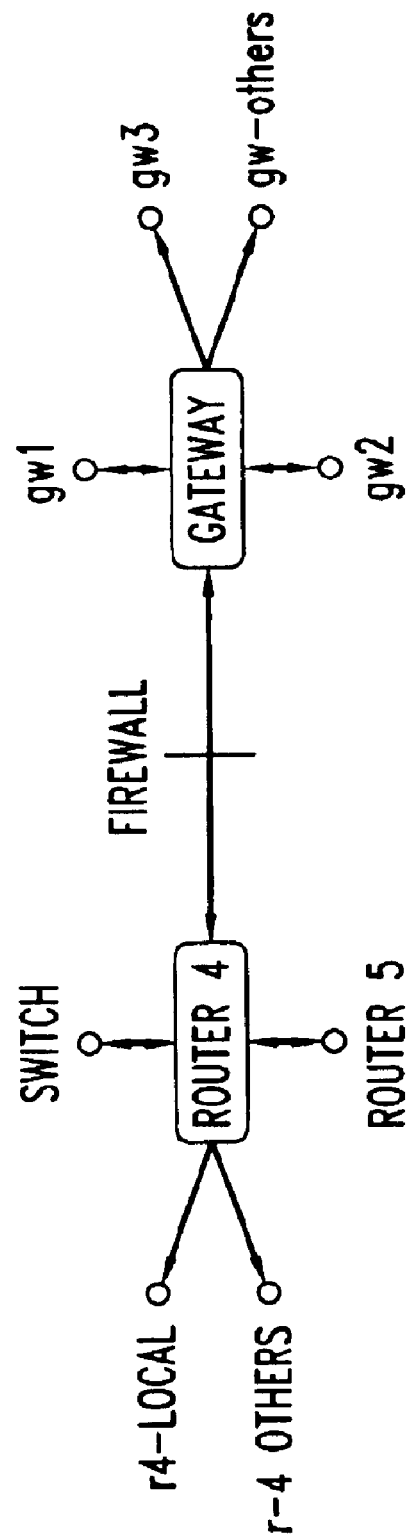
FIG. 8 is a schematic diagram of an illustrative network having two routers.

FIG. 8 shows a two-router portion of the larger Lucent network depicted in FIG. 1. The routers, labeled Router4 and Gateway, each support four edge nodes and one internal link. This gives a total of 20 one-way link interfaces. Router4 serves one organization within Lucent and Gateway is the router with a connection to the public Internet. The edge nodes represent sub-networks. Applying our methods to this somewhat more complex topology demonstrates that the approach is computationally feasible, though not fully scalable to larger problems. Experience with this network also motivates some directions for future work.

Among the 20 link count measurements there are, in principle, four linear dependencies corresponding to the balance between incoming and outgoing byte counts around each router and to the fact that traffic measurements between Router4 and gateway are collected at interfaces on both routers. In reality there are inevitable discrepancies in the counts—up to 5%, for example, between total incoming and total outgoing traffic at these routers. We reconcile these inconsistencies before estimating traffic parameters.

Suppose there are n redundancy equations arising from the network topology:

$$a_i' y_t = b_i' y_t, \ i=1, \ldots, n,$$

where $a_i$, $b_i$ are 0–1 vectors with $a_i' b_i = 0$. When measurements do not provide exact equality, we re-scale them using the following iterative proportional adjustment method. Without loss of generality, assume $b_i' y_t \geq a_i' y_t$. Moving cyclically through $i=1, \ldots, n$, multiply the components of $y_t$ corresponding to nonzero elements of $a_i$ by the factor $(b_i' y_t)/(a_i' y_t)$. Iteration stops when $(b_i - a_i)' y_t$ is sufficiently close to zero. Such reconciliation makes adjustments proportional to the actual link measurements, which is an intuitively fair approach. Following adjustment, we remove redundant elements from both $y_t$ and A and then locally fit the iid normal model obtaining estimates of both $\lambda_t$ and $x_t$.

Figure 9A:
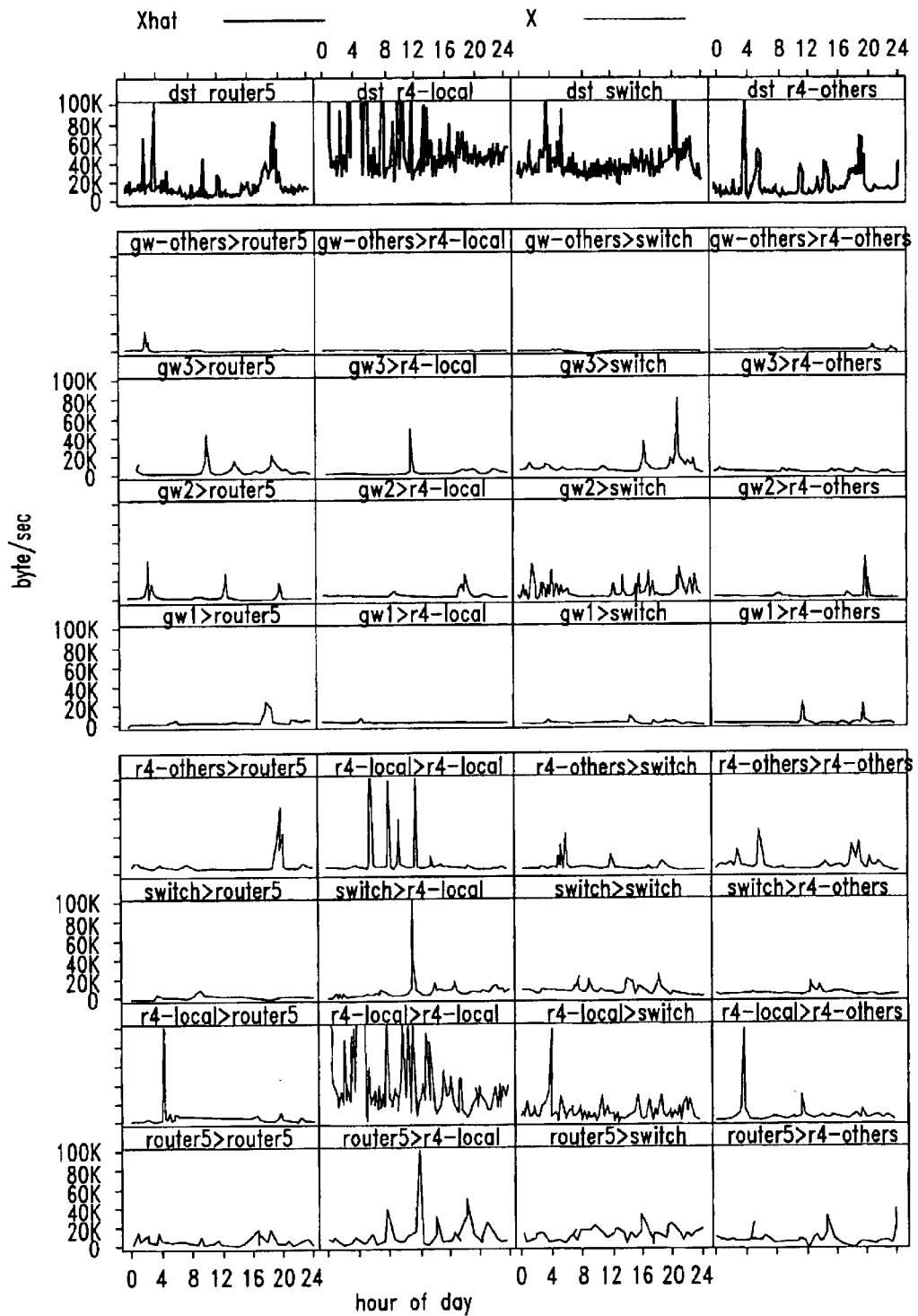
FIG. 9 is a plot of estimated OD counts versus time in the two-router network of FIG. 8.
Figure 9B:
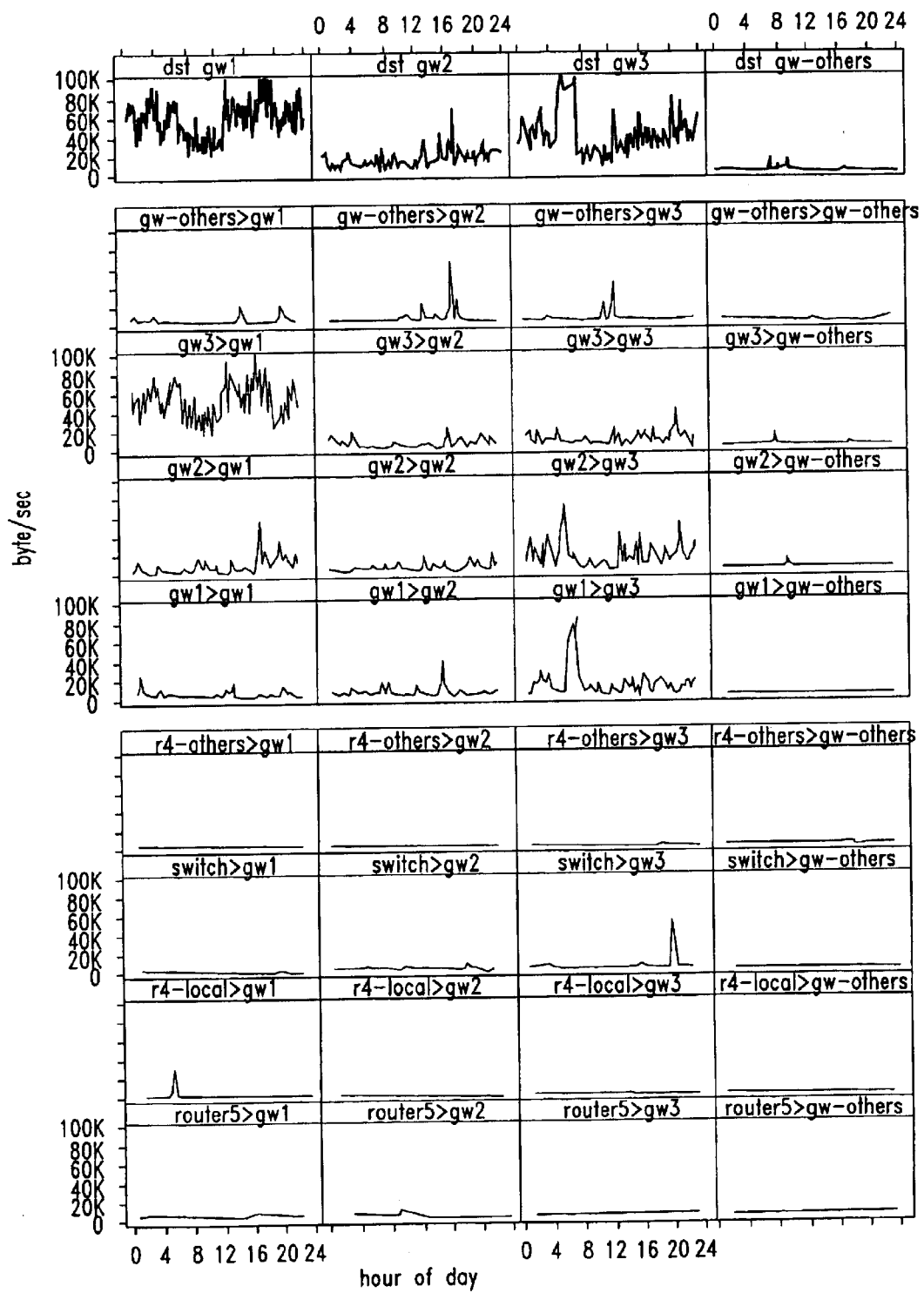
Figure 9C:
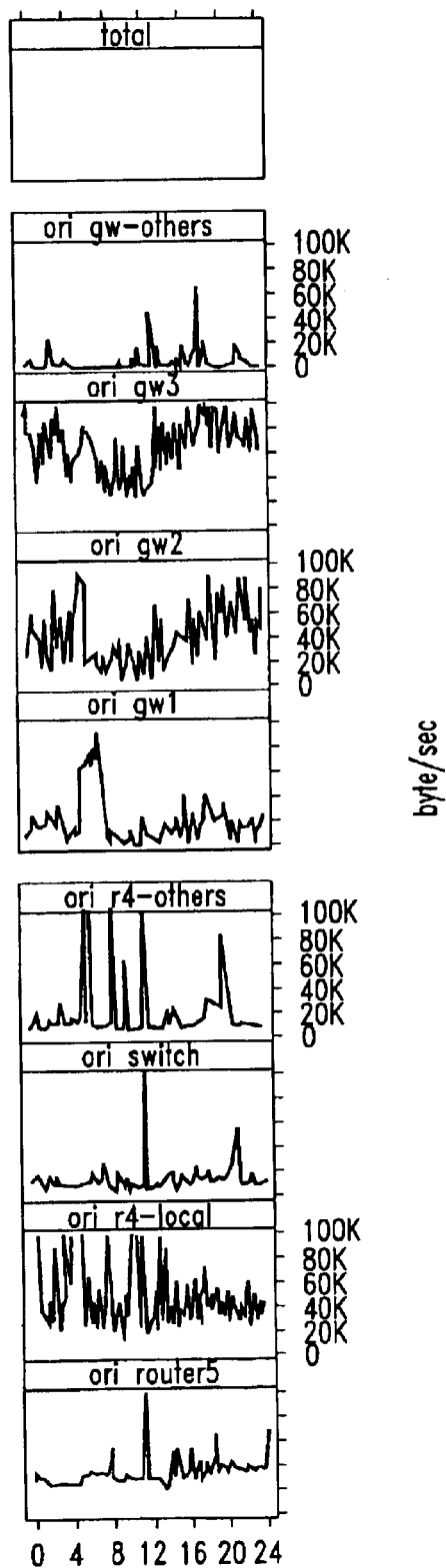

Estimates $\hat{\lambda}_t$ for a recent one day period are shown in FIG. 9 on a scale of 0 to 100K bytes/sec which clips off some of the highest peaks in the data. Qualitatively, we expected to see lower traffic levels in the upper-left and especially lower-right blocks of panels corresponding to OD pairs on different routers. We also anticipated that only a few pairs would usually dominate the data flow. This tends to make the estimation problem easier because simultaneous peaks in a single origin and single destination byte count can be attributed to a single OD pair with relatively little ambiguity.

Computation time for this network with 64 OD pairs was 35 sec per estimation window which compares to 6 sec for the Router1 network with 16 OD pairs. In general, the number OD pairs can grow as fast as the square of the number of links.

Scaling these methods to work for larger problems is an area of current research. Our identifiability result implies that for a given OD pair, byte counts from only the two edge-nodes are needed to estimate the intensity of traffic between them. All of the other byte counts provide supplementary information. This suggests handling large networks as a series of subproblems, each involving a given subset of edge nodes and simplifying the rest of the network by forming aggregate nodes.

7 CONCLUSIONS

Practical realities dictate that information needed for managing computer networks is sometimes best obtained through estimation. This is true even though exact measurements could be made by deploying specialized hardware and software. We have considered inference of origin-destination byte counts from measurements of byte counts on network links such as can be obtained from router interfaces. All commercial routers can report their link counts whereas measuring complete OD counts on a network is far from routine.

Using a real-life example, we have shown that OD counts can be recovered with good accuracy relative to the degree of ambiguity that remains after marginal and positivity constraints are met. We model the counts locally as iid normal conditional on the mean. Identifiability of the OD parameters from link data requires a relation between means and variances of OD counts. A power-law family provides a model which is a natural extension of the normal approximation to the Poisson and incorporates extra-Poisson variation observed in sample data.

Simple local likelihood fitting of an iid model is not sufficient because large fitting windows over-smooth sharp changes in OD traffic, while a small windows cause estimates to be unreliable. A refinement in which the logs of positive parameters are modeled as random walks, penalizes the local likelihood surface enough to induce smoothness in parameter estimates while not unduly compromising their ability to conform to sharp changes in traffic. Section 4 laid out a fully normal approximation to this approach and demonstrated how effectively it recovers OD byte counts for our Router1 network.

There are several possible directions for further work. First and most important is developing an efficient algorithm for large size networks, as we discussed briefly in Section 6. Second, we would like to study how accuracy of traffic estimates for different OD pairs is affected by the network topology. Third, we would like to fold measurement errors into the data model rather than reconciling them up front and then proceeding as if there were no such errors. Additional topics are cross-validation for window sizes and prior variances. modeling changes in $\hat{\lambda}_t$ with more realism than the random walk, and replacing the normal distribution with a heavy-tailed positive distribution.

Progress in these areas would be especially helpful for analyzing large networks but the basic approach we have outlined is still appropriate. Our methods can easily be used on portions of networks with a small-to-moderated number of edge nodes. Giving LAN administrators access to OD traffic estimates provides them with a much more direct understanding of the sizes and timing of traffic flows through their networks. This is an enormous help for network management, planning and pricing.

In the foregoing discussion, we have used abbreviated citations to refer to several books which provide background information. The full citations are as follows: (Anderson and Moore, 1979) refers to B. D. O. Anderson and J. B. Moore, Optimal Filtering, Prentice-Hall, 1979. (CAIDA, 1979) refers to The Cooperative Association for Internet Data Analysis, Cflowd Flow Analysis Software (version 2.0), Author, 1999; www.caida.org/Tools/Cflowd. (Gelman et al. 1995) refers to A. Gelman, J. B. Carlin, H. S. Stem, and D. B. Rubin, Bayesian Data Analysis, Chapman and Hall, 1995. (Hastie and Tibshirani, 1990) refers to T. J. Hastie and R. J. Tibshirani, Generalized Additive Models, Chapman and Hall, London, 1990. (Loader, 1999) refers to C. Loader, Local REgression and Likelihood, Springer-Verlag, New York, 1999. (West and Harrison, 1997) refers to M. West and J. Harrison, Bayesian Forecasting and Dynamic Models, Springer-Verlag, New York, 1997.

What is claimed is:

1. A method for estimating a plurality of traffic counts, denominated OD counts, between individual node pairs of a packetized communication network, wherein: (i) the OD counts are to be derived from link counts measured at interfaces of packet-forwarding devices in the network, (ii) at least some of the link counts are aggregated over plural origin-destination node pairs, and (iii) there is a statistical model for the likelihood distributions of the OD counts, the model has a plurality of parameters, and said parameters include means of the OD counts; and the method comprises:

a) obtaining a plurality of measured link counts;
 b) obtaining a routing scheme of the network that relates measured link counts to unknown OD counts; and
 c) urging a likelihood function of each of the parameters in the statistical model toward an optimal value, thereby to obtain a refined estimate of said parameters that is more optimal than an initial estimate thereof; wherein:

said urging step as recited in (c) is performed at least once; and in at least one said urging step, the likelihood function being urged is a penalized likelihood function that depends on both a current time window of observed link counts and on a prior distribution of the parameters in the statistical model, and said penalized likelihood function is based on link counts observed in previous time windows.

2. The method of claim 1, further comprising:

d) making an initial estimate of the OD counts from said refined estimate and from a conditional expectation formula; and
 e) making a further estimate of the OD counts by applying iterative proportional fitting to the results of the initial estimate.

* * * * *